(12) United States Patent
Littlewood et al.

(10) Patent No.: US 10,623,126 B2
(45) Date of Patent: Apr. 14, 2020

(54) NETWORK RESOURCE OPTIMIZATION BASED ON TIME-VARYING TRAFFIC IN OPTICAL NETWORKS

(71) Applicant: Ciena Corporation, Hanover, MD (US)

(72) Inventors: Paul Littlewood, Johns Creek, GA (US); Michel P. Bélanger, Montreal (CA); Christine Tremblay, Mont-Royal (CA); Md. Nooruzzaman, Montreal (CA); Nabih Alloune, Montreal (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/975,191

(22) Filed: Dec. 18, 2015

(65) Prior Publication Data
US 2017/0180050 A1 Jun. 22, 2017

(51) Int. Cl.
*H04J 14/02* (2006.01)
*H04B 10/27* (2013.01)

(52) U.S. Cl.
CPC .......... *H04J 14/0227* (2013.01); *H04B 10/27* (2013.01)

(58) Field of Classification Search
CPC ............................. H04B 10/27; H04J 14/0227
See application file for complete search history.

(56) References Cited

U.S. PATENT DOCUMENTS

| | | | |
|---|---|---|---|
| 8,611,743 B2 | 12/2013 | Ji et al. | |
| 9,124,369 B2 | 9/2015 | Ji et al. | |
| 2002/0122228 A1* | 9/2002 | Rappaport | H04L 43/026 398/98 |
| 2005/0105905 A1* | 5/2005 | Ovadia | H04L 12/5695 398/47 |
| 2012/0219293 A1 | 8/2012 | Boertjes et al. | |
| 2013/0004174 A1* | 1/2013 | Lee | H04J 14/0246 398/79 |
| 2013/0259055 A1 | 10/2013 | Ji et al. | |
| 2014/0314414 A1* | 10/2014 | Cheng | H04J 14/02 398/68 |
| 2015/0043915 A1 | 2/2015 | Patel et al. | |
| 2015/0043920 A1 | 2/2015 | Ji et al. | |
| 2015/0125152 A1* | 5/2015 | Ji | H04J 14/02 398/76 |

OTHER PUBLICATIONS

Submarine Telecoms Industry Report, Issue 3, 2014, Terabit Consulting, Submarine Telecoms Forum.
(Continued)

*Primary Examiner* — Leslie C Pascal
(74) *Attorney, Agent, or Firm* — Clements Bernard Walker Law; Christopher L. Bernard; Lawrence A. Baratta, Jr.

(57) ABSTRACT

Systems and methods of network resource optimization based on time-varying traffic in an optical network with a filterless architecture include determining traffic variations based on the time-varying traffic in the optical network; and adjusting one or more of transceivers and wavelengths between nodes in the optical network based on the traffic variations and using the filterless architecture. The adjusting minimizes the number of the transceivers and the wavelengths based on the traffic variations and the time-varying traffic. The optical network can geographically span multiple time zones, contributing to the time-varying traffic.

20 Claims, 18 Drawing Sheets

(56) References Cited

OTHER PUBLICATIONS

Jin-Xing Cai et al., "Transmission of 96 100-Gb/s Bandwidth-Constrained PDM-RZ-QPSK Channels With 300% Spectral Efficiency Over 10610 km and 400% Spectral Efficiency Over 4370 km," Journal of Lightwave Technology, vol. 29, No. 4, Feb. 15, 2011.
Émile Archambault et al., "Design and Simulation of Filterless Optical Networks: Problem Definition and Performance Evaluation," J. Opt. Commun. Netw. /vol. 2, No. 8/Aug. 2010.
Guillaume Mantelet et al., "PCE-Based Centralized Control Plane for Filterless Networks," IEEE Communications Magazine • May 2013.
Christine Tremblay et al., "Passive filterless core networks based on advanced modulation and electrical compensation technologies," Telecommun Syst DOI 10.1007/s11235-013-9725-y, 2013.

* cited by examiner (a)

(b)

NETWORK RESOURCE OPTIMIZATION BASED ON TIME-VARYING TRAFFIC IN OPTICAL NETWORKS

FIELD OF THE DISCLOSURE

The present disclosure generally relates to networking systems and methods. More particularly, the present disclosure relates to network resource optimization in optical networks by taking advantage of the nature of time-varying traffic.

BACKGROUND OF THE DISCLOSURE

Conventionally, optical networks are deployed in static configurations, such as submarine optical networks as well as terrestrial optical networks. With a drive towards scalable, agile and dynamic networking solutions, directionless, contentionless, and gridless (CDCG) Reconfigurable Optical Add/Drop Multiplexers (ROADMs) are required for complete flexibility in wavelength connectivity. A CDCG-ROADM can be programmed to switch connections operating at any wavelength with any spectral requirement to any outgoing direction without contention. This ensures resource optimization in the optical layer. Disadvantageously, CDCG-ROADMs require a large number of optical components with high cost and higher power consumption. In addition, the ROADMs that are deployed in terrestrial applications are not qualified to be deployed at the Branching Units (BUs) in submarine networks. In conventional submarine networks (i.e., undersea or underwater networks), fixed BUs connect branches with the trunk under the ocean. This employs a fixed, pre-determined wavelength arrangement, which limits the flexibility of the network. Reconfigurable BUs (RBUs) based on passive multiplexer/demultiplexer, wavelength blocker (WB), or wavelength selective switch (WSS) technologies have been proposed recently. The RBUs require a large number of switches, and the introduction of WSSs in the BU increases control complexity. In addition, since the RBUs contain additional filtering components, they need some additional amplifiers for insertion loss compensation, and it might be necessary to monitor and equalize the power coming from each branch. Submarine ROADMs using passive branching units such as optical interleavers and de-interleavers have also been proposed. This has limited reconfiguration capability as odd/even channels are separated and sent to the two output ports. Thus, in such a situation, a reconfiguration of the wavelength may be needed from the edge nodes in order to adapt to the traffic change and ensure resource optimization.

BRIEF SUMMARY OF THE DISCLOSURE

In an exemplary embodiment, a method of network resource optimization based on time-varying traffic in an optical network with a filterless architecture includes determining traffic variations over time; and adjusting one or more of transceivers and wavelengths between nodes in the optical network to match the traffic demands at various time intervals. The adjusting minimizes a number of the transceivers based on the traffic variations. As an example, the optical network can geographically span multiple time zones, with each time zone placing different loads on the network at different times. The optical network can be a submarine network with branching units including splitters and combiners creating the filterless architecture. The routing and wavelength assignment algorithm is performed one of a) offline for capacity planning in the optical network and b) online for capacity reassignment in near-real time in the optical network. The filterless architecture is a broadcast-and-select node architecture, where one wavelength is broadcast to a plurality of nodes through splitters and combiners, and a coherent optical receiver which selectively receives a desired wavelength from a plurality of available wavelengths and rejects a plurality of undesired wavelengths without the need for a channel filter. The adjusting can be performed over a 24-hour period or a different period based on the traffic variations.

In another exemplary embodiment, an apparatus adapted for network resource optimization based on time-varying traffic in an optical network with a filterless architecture includes circuitry adapted to determine traffic variations based on the time-varying traffic in the optical network; and circuitry adapted to cause adjustment of one or more of transceivers and wavelengths between nodes in the optical network based on the traffic variations and using the filterless architecture. The adjustment minimizes a number of the transceivers and the wavelengths based on the traffic variations and the time-varying traffic. The optical network can geographically span multiple time zones, contributing to the time-varying traffic. The optical network can be a submarine network with branching units including splitters and combiners for the filterless architecture. The adjustment is performed one of a) offline for capacity planning in the optical network and b) online for capacity reassignment in the optical network. The filterless architecture can include a broadcast-and-select node architecture, where one wavelength is broadcast to a plurality of nodes through splitters and combiners, and a coherent optical receiver which selectively receives a desired wavelength from a plurality of available wavelengths and rejects a plurality of undesired wavelengths without the need for a channel filter. The filterless architecture can include passive optical components. The adjustment can be performed over a 24-hour period based on the traffic variations.

In a further exemplary embodiment, a system for network resource optimization based on time-varying traffic in an optical network with a filterless architecture includes a processor; and memory storing instructions that, when executed, cause the processor to determine traffic loading based on the time-varying traffic in the optical network, and cause adjustment of one or more of transceivers and wavelengths between nodes in the filterless optical network. The adjustment minimizes a number of the transceivers and the wavelengths based on the traffic variations and the time-varying traffic.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6A illustrates transceiver and wavelengths saving, and FIG. 6B illustrates only wavelength-saving (only one direction is shown for simplicity);

FIGS. 14A and 14B include a filterless solution with regeneration and FIGS. 15A and 15B include a filterless solution without regeneration;

DETAILED DESCRIPTION OF THE DISCLOSURE

Figure 1:
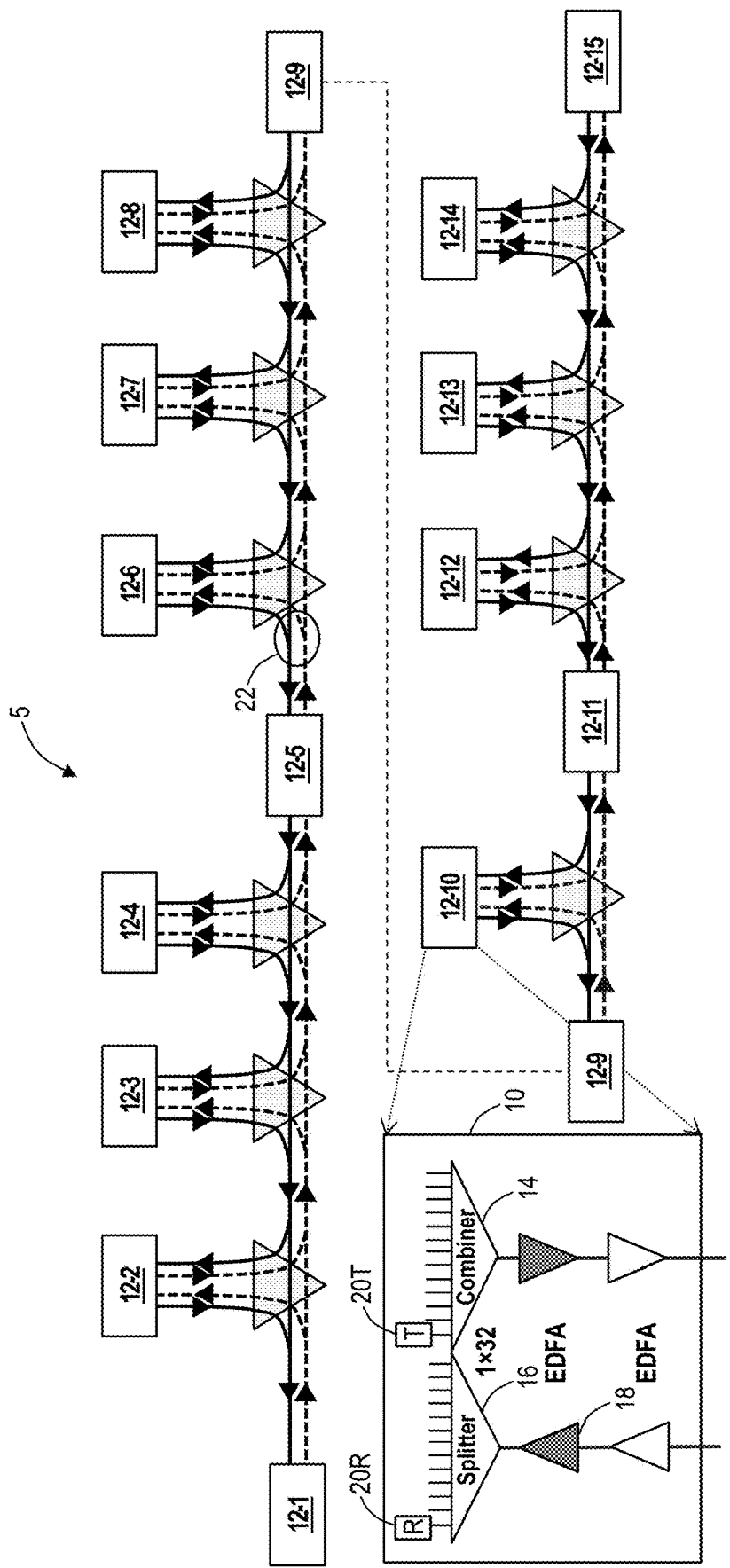
FIG. 1 is a network diagram of a network, such as a submarine network, with a filterless network architecture.

In various exemplary embodiments, network resource optimization systems and methods are described based on time-varying traffic in optical networks. In an exemplary embodiment, a filterless optical network architecture is proposed to introduce agility in optical networks. The filterless optical network architecture can be based on passive broadcast-and-select nodes and coherent transceivers at edge terminals. The filterless optical network architecture can be implemented in a submarine optical network, a terrestrial optical network, or a combination. In an exemplary embodiment, the filterless optical network architecture can be in a trunk and branch submarine network topology. In various exemplary embodiments, the systems and methods include a network resource optimization technique based on time-varying traffic. As described herein, performance analysis shows how the proposed network resource optimization can bring significant resource savings through lightpath reconfigurations from edge nodes. The performance is compared with a conventional solution in terms of cost and wavelength consumption. It is also shown that the filterless architecture can bring significant cost savings in terms of terminal and line equipment and reduce the number of transceivers while offering the same agility as the conventional network architecture.

Filterless optical networks inherently support efficient resource sharing between traffic paths without active switching. The filterless network architecture reduces network complexity and increases effective network capacity compared to a static network when the traffic loads applied to different ingress and egress points vary with time, and are not coincident in time. The combination of a filterless light tree that connects a plurality of network nodes, with time variant nodal pair loading leads to the realization that capacity can be re-assigned, as needed, between different nodal pairs of a common light tree simply be re-tuning coherent receivers.

The systems and methods exploit a property of large scale optical networks that loading typically varies deterministically at different times of the day. For example, in ultra-long-haul (ULH) submarine networks spanning thousands of kilometers over different time zones, the traffic at a given node reaches peak and trough values at different times during the day, and the amplitude of the traffic between two nodes depends on their locations in the time axis. Similar characteristics can be seen in ULH terrestrial networks, such as nationwide networks in the U.S. which can span multiple time zones. The novelty in the systems and methods recognizes that this traffic load variation fits well with the inherent passive switching and capacity sharing capabilities of filterless networks to re-use network resources without employment of active switches and reduce overall resource requirements and eliminate active elements from networks. Theses efficiencies apply to any network, terrestrial or submarine, where daily traffic variation is significant, i.e., where different nodes load the network at different times. The systems and methods may be of particular interest to submarine network operators because of their aversion to placing active elements undersea.

In the broadcast-and-select node architecture, one wavelength is broadcast to a plurality of nodes through splitters and combiners, and the receiver node selectively receives the desired wavelengths from the plurality of wavelengths and rejects the plurality of undesired signals without the need for a channel filter. This delivers lightpath reconfiguration capability in optical networks, where the reconfigurations are performed from the edge nodes. The systems and methods include techniques that a) show that this reconfiguration saves a significant percentage of the transceiver and wavelengths in a filterless (for use in planning systems for example), and b) show that real-time assessment can be made of network consumption, and real-time reconfiguration of the network can be made to satisfy optimally loading and demands. Thus, with the systems and methods, either using offline planning or real-time reconfiguration, a significant percentage of the transceiver and wavelengths is saved in a filterless network covering a large or small dispersed geographical area using network resource optimization at the edge nodes The foregoing descriptions show the dynamic characteristic of example networks, clarify dynamic rearrangement of capacity for optimizing network resource utilization, and lower capital cost through the networks broadcast-and-select feature. Additionally, the systems and methods can be used in Routing and Wavelength Assignment (RWA) or Routing and Spectrum Assignment (RSA) techniques.

Filterless Network Architecture

Referring to FIG. 1, in an exemplary embodiment, a network diagram illustrates a network 5 with a filterless network architecture 10. The network 5 includes a plurality of nodes 12-1 to 12-15. In an exemplary embodiment, the network 5 can include a submarine network, and the foregoing exemplary embodiments are described as such, but those of ordinary skill in the art will recognize the systems and methods are equally applicable to terrestrial networks as well. That is, while the foregoing exemplary embodiments are described with reference to submarine networks, the systems and methods are applicable to any kind of network topology where daily traffic variation is significant, and topology is such that reconfigurable add-drop multiplexers (ROADMs) are either unnecessary or employment is undesirable.

The filterless network architecture 10 includes passive optical combiners 14 and optical splitters 16 and various optical amplifiers 18 at the nodes 12. A coherent optical modem 20 includes a transmitter 20T connected to the optical combiner 14 and a receiver 20R connected to the optical splitter 16. The filterless network architecture 10 also include 1×2 splitters and combiners 22 located at the trunk and branches, i.e., the BUs. Again, the network 5 can be a submarine network that includes dry plant and wet plant. The dry plant contains the elements that are installed on land, which can include tunable coherent receivers 20R, optical amplifiers 18 such as Erbium Doped Fiber Amplifiers (EDFAs), optical routing elements including the optical combiners 14 and the optical splitters 16, and the like. The wet plant includes the elements which are laid under water such as cables, repeaters, and BUs, which can include passive combiners and splitters qualified for submarine applications, such as the splitters and combiners 22. Note, in a terrestrial deployment, the BUs can be omitted.

In the example of FIG. 1, the nodes 12-1, 12-2, 12-3, 12-4, 12-5 are bidirectionally connected to one another by one or more fibers, the nodes 12-5, 12-6, 12-7, 12-8, 12-9 are bidirectionally connected to one another by one or more fibers, the nodes 12-9, 12-10, 12-11 are bidirectionally connected to one another over one or more fibers, and the nodes 12-11, 12-12, 12-13, 12-14, 12-15 are bidirectionally connected to one another over one or more fibers. Each of the foregoing can be referred to as a fiber tree. The filterless network architecture 10 broadcasts a single wavelength to a plurality of nodes 12 through 1×2 splitters and combiners 22 at the BUs. This results in each of the receivers 20R belonging to the same fiber tree receiving almost the whole spectrum (e.g., 88 channels with 50 GHz spacing) which is split through the splitters 16 installed prior to the receivers 20R. Thus, each of the receivers 20R receives a number of wavelengths and selectively receives the desired wavelengths from all of the wavelengths using the tunability of coherent receivers. Specifically, the receiver 20R can include a mixer, which combines the incoming optical channel signal with a narrow-band light generated by a local laser tuned to a specific center wavelength, $\lambda_{LO}$, of the optical channel signal. The local laser can be referred to as a Local Oscillator (LO). This arrangement may be used to enable coherent detection of the optical channel signal along with Digital Signal Processing (DSP). Lightpath reconfigurations in this way do not require any switching inside the BUs and can also eliminate the switching requirement at terminal nodes. Additionally, the filterless network architecture 10 is compatible with gridless spectrum allocation such as in flexible grids.

The filterless network architecture 10 leverages coherent detection and advanced digital signal processing (DSP). Coherent transmission systems operating at 100 Gb/s and above over ultra-long distances are commercially available. In terrestrial networks, the filterless network architecture 10 for agile edge nodes equipped with coherent transponders and passive broadcast-and-select nodes has been shown to be a cost-effective architectural solution for regional and long-haul terrestrial applications. The filterless network architecture 10 can bring some other significant advantages, such as reduced installed first cost (IFC) of the network 5, ease of maintenance, resilience and multicast capabilities, and the like. The benefits of the filterless network architecture 10 have been explored from a cost, wavelength consumption, and control perspectives; however, their application to submarine networks has not yet been considered nor has their optimized use with time-varying traffic patterns.

Filterless Network Architecture—Submarine Network

In an exemplary embodiment, the systems and methods propose the filterless network architecture 10 in submarine networks with agile edge nodes equipped with coherent transponders, as well as passive colorless combiners and splitters in the terminals and BUs. As such, flexibility is achieved at a reduced cost without requiring active components in the submerged optical line system. Since there is no active device inside the BU, it does not consume any power, and its connectivity is immune to power failure issues, which increases the reliability. In addition, lightpath reconfiguration can be executed from the terminal nodes without any physical reconfiguration of network elements.

Commercial transoceanic optical communication systems exacerbate the challenges of high-speed optical signal transmission over long-haul distances. Recent research work has shown the capability of transmitting 100 Gb/s per wavelength-division multiplexing (WDM) channel over distances longer than 10,000 km. The successful development of 100 Gb/s terrestrial optical transmission systems, as well as the global traffic increase, drives the development of 100 Gb/s submarine networks. The most recent optical transmission systems based on coherent technology exhibit a high tolerance to linear impairments such as Chromatic Dispersion (CD) and Polarization Mode Dispersion (PMD). Today, coherent optical communication systems operating at 100 Gb/s are deployed for both terrestrial and transoceanic applications.

Again, submarine networks include a dry plant and a wet plant. The dry plant refers to the Submarine Line Terminal Equipment (SLTE) installed at the cable landing stations which include the modems 20, Wavelength Selective Switches (WSSs) and mux/demux equipment for conventional deployments, as well as line monitoring equipment, power feed equipment, and Network Management System (NMS). The wet plant includes network elements which are laid under water such as the cables, the Erbium-doped fiber amplifiers (EDFAs) which are called repeaters, and the BUs that interconnect the cable landing stations to the trunk through branches. The dry plant can include a set of terrestrial nodes, called cable landing stations, which are interconnected through an optical line system (the wet plant) deployed undersea over distances up to several thousands of kilometers. The line system includes a trunk optical fiber cable equipped with optical line amplifiers (or repeaters) and BUs for interconnecting the cable landing stations to the trunk through branches.

ROADMs deployed in terrestrial applications are generally not qualified for submarine applications. Thus, such ROADMs can only be installed at the cable landing stations but not at the BUs; therefore, network reconfiguration and wavelength reassignment is not possible in conventional submarine networks. Current branching units include passive or power-switched fiber joints or fixed OADMs for connecting the branches to the trunk. One of the key issues with the passive conventional BUs is that they employ a fixed, pre-determined wavelength arrangement. As the outwardly increasing bandwidth hungry demand for mobile, video-over-Internet, and cloud-based services continues to grow and becomes more dynamic, the submarine network operators are not only forced to rebuild or retool their infrastructures to stay competitive but also need to deploy scalable, versatile, and dynamic networking solutions that can adapt to the changing needs of users in a cost-effective manner. Next generation networks have to provide the ability to scale bandwidth up or down where and when it is needed and the intelligence to add new services easily.

Reconfigurable BUs based on passive multiplexer/demultiplexer (mux/demux), wavelength blocker (WB) or wavelength selective switch (WSS) technologies have been proposed. However, these devices still require several qualification tests (such as performance, robustness, lifetime, and packaging) to be passed before they can be deployed under the sea. In some of these studies, the reconfiguration problem is generally considered as a sub-band assignment of the spectrum instead of individual wavelengths assignment. The complexity of the reconfigurable BUs architecture increases, as they might need to realize the command and response functions, and may need to measure the new optical spectrum and send the necessary information to the cable landing station to confirm the new configuration. Since the reconfigurable BUs contain additional filtering components, they need some additional amplifiers for compensating the insertion losses, and it might be necessary to monitor and equalize the power coming from each branch. Thus, in such a situation, a reconfiguration of the wavelength may be needed to be performed from the edge nodes in order to adapt the traffic change.

Submarine networks are long haul optical networks that can be classified into point-to-point, trunk and branch, ring, mesh, and festoon architectures, depending on the connectivity and traffic requirements between different geographical sites separated by distances up to several thousands of kilometers. Undersea networks are designed for ultra-high capacity (e.g. 106×200 Gb/s per fiber pair) in order to meet the global traffic demand. Several design tradeoffs need to be considered for designing and implementing submarine network systems. In contrast to terrestrial networks, the terminals and line systems of submarine networks are designed and optimized in two separate steps. In the first step, the wet and dry plants of submarine systems are designed in concert for an initial design capacity. But, as traffic increases and transceiver technology improves, the legacy systems are commonly upgraded (re-optimized) beyond their initial design capacity without changing the cable system. System performance, capacity, and cost of submarine systems are primarily impacted by the reach (exceeding 12,000 km for transpacific links) and capacity requirements. The systems must also exhibit high reliability and a long operating lifetime (e.g., 25-year).

The network 5 is a typical submarine network with six cable landing stations (i.e., the nodes 12-1, 12-5, 12-9, 12-11, 12-15). For example, the distance between the nodes 12-1, 12-15 can be about 18,500 km, which has a similar coverage typically that of the SEA-ME-WE-4 network. The SEA-ME-WE-4 submarine cable system includes main backbone across the South East Asia and Western Europe having more than 15 branches (corresponding, e.g., to the nodes 12-1 to 12-15) in various countries. The cable landing stations can be equipped with SLTE including the modems 20, channel mux/demux, WSS-based ROADMs, as well as Erbium-doped fiber amplifiers (EDFAs) for compensating the insertion loss of the mux/demux and WSS.

In an exemplary embodiment, the filterless network architecture 10 is proposed for a submarine network. This can include the 1×2 splitters and combiners 22 located on the trunk and branches, i.e., the branching units. In the terminals of the filterless network architecture 10, the mux/demux and WSS are replaced by the passive optical splitters 16 and the optical combiners 14. The dry plant now contains tunable coherent receivers 20R, and passive optical combiners and splitters. Two extra amplifiers 18 can be used to compensate for the insertion loss of the splitters 16 and the combiners 14. The BUs are composed of passive splitters and combiners 22 only, and these components are already qualified for submarine applications.

In the filterless network architecture 10, a set of interconnected fibers forms a fiber tree. In the network 5, there are four fiber trees. In each fiber tree, the traffic originating from the upstream nodes is broadcast to most of the downstream nodes through 1×2 splitters and combiners 22 installed at the BUs. This results in each receiver node receiving a multiple number of wavelength channels through the 1×32 splitters 16 installed at the terminals. In this scenario, the receiver 20R selectively receives the desired wavelengths from the range of wavelengths and rejects the undesired signals without the need for a channel filter by using the tunability of coherent receivers. This delivers lightpath reconfiguration capability in submarine optical networks without any switching requirement in the BUs and at terrestrial nodes.

Time-Based Daily Traffic Variation

Figure 2:
FIG. 2 is a graph of exemplary traffic variation over a 24-hour period in the optical network of FIG. 1.

Referring to FIG. 2, in an exemplary embodiment, a graph 30 illustrates exemplary traffic variation over a 24-hour period in the optical network 5. In the graph 30, it is 6 am at the node 12-1 and 3 pm at the node 12-15. Again, the optical network 5 can be a submarine network, i.e., a LH or ULH optical network, that spans thousands of kilometers and different time zones. Accordingly, the traffic at each node 12 in the optical network 5 typically reaches peak and trough values at different times of the day as shown in the graph 30. The traffic loads applied to different nodes 12 are not coincident in time, and the amplitude of the traffic between two nodes 12 depends on their locations on the time axis. As shown in the graph 30, the peak of the traffic variation waveform moves across all the nodes 12 in a day. The traffic can have peak values and trough values. Because of this variation, the transceiver used in a given node 12 will not be occupied all the time of a day. This variation presents an opportunity for network operators to employ the resources more efficiently by allocating them to match the traffic demand from a different network node which may be increasing. This variation enables network operators to allocate network resources more efficiently by assigning only enough at any given time to support the traffic demand as it increases towards its peak value between node pairs. As such, fiber trees can be shared among a number of paths between nodes without requiring active switches.

In an exemplary embodiment, the systems and methods leverage the agility of the filterless network architecture 10 experiencing a time-based daily traffic variation to provide transceiver and wavelength savings through various network resource optimization techniques. The efficiencies apply to any network, terrestrial or submarine, where daily traffic variation is significant—where different nodes load the network 5 at different times. Again, the present disclosure uses an example of resource saving in such a ULH submarine filterless network architecture 10 to describe the benefits of the network resource optimization. Those of ordinary skill in the art will recognize the network resource optimization can be applied to any network with daily traffic variations and the filterless network architecture 10.

Capacity Limits

Figure 3:
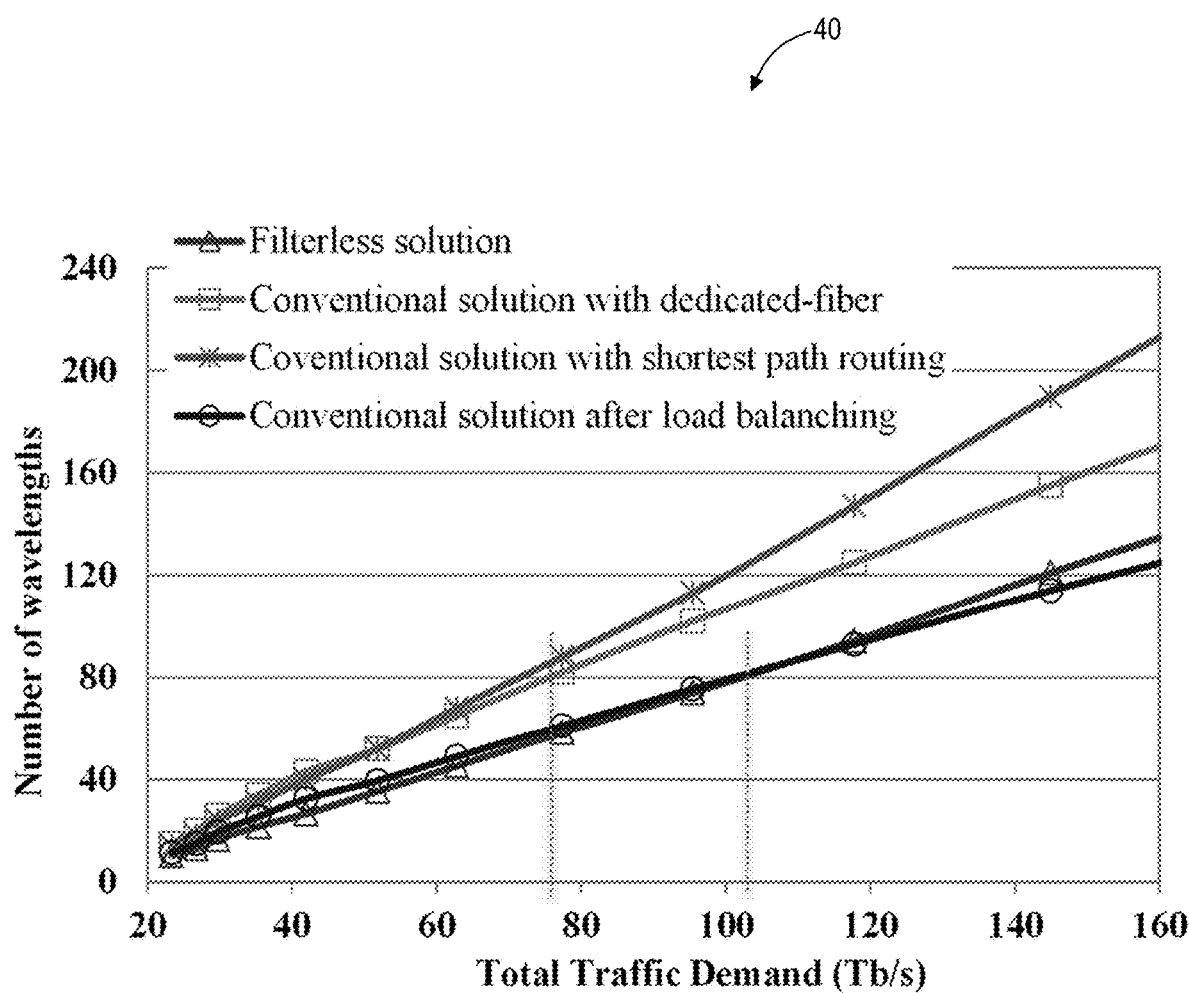
FIG. 3 is a graph of capacity limits of the filterless network architecture relative to conventional solutions with dedicated-fiber, shortest path routing, and load balancing.

Referring to FIG. 3, in an exemplary embodiment, a graph 40 illustrates capacity limits of the filterless network architecture 10 relative to conventional solutions with dedicate-fiber, shortest path routing, and load balancing. In this study of capacity limits, the wavelength consumption was calculated as a function of the traffic level, and the results are shown in the graph 40, where the capacity limit is defined as the traffic level corresponding to a fully-loaded optical line system (80 wavelengths). For the conventional solution, three different traffic distribution schemes were considered. In "conventional solution with dedicated-fiber" scheme, specific fiber pairs are used to carry a dedicated amount of traffic between the 15 nodes in the network 5. This scheme corresponds to the realistic case where the 3 fiber pairs of the conventional solution would be used by 3 different network operators. The result shows that this scheme has higher wavelength consumption. In other words, it can accommodate less traffic compared to the filterless network architecture 10.

In the "conventional solution with shortest path routing" scheme, the total traffic is distributed over the 3 fiber pairs based on the shortest path. In this scenario, some of the links become congested faster as all the demands are routed on the shortest path which generates congestion on some links. In the "conventional solution with load balancing" scheme, the traffics on the congested paths are routed to the other available paths which are less loaded. However, this is not a desirable solution by all operators, because, in this scheme, the latency is higher as the traffic travels the less congested route, which is not shortest in terms of route or hop, to avoid congestions. As shown in the graph 40, it is interesting that the capacity limit for the filterless network architecture 10 is almost equal to the capacity limit of the conventional solution after load balancing.

Cost Comparisons

Figure 4A:
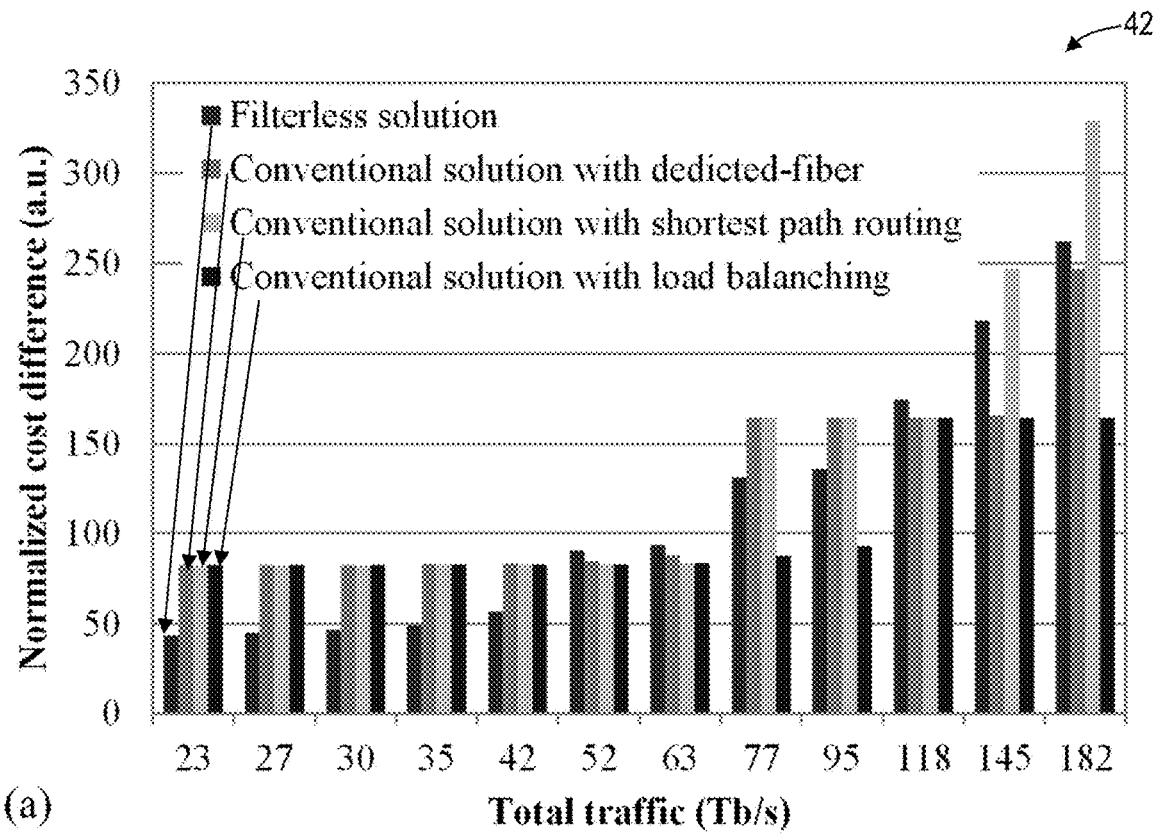
FIGS. 4A, 4B, and 5 are graphs of costs of the filterless network architecture relative to conventional solutions with dedicated-fiber, shortest path routing, and load balancing.
Figure 4B:
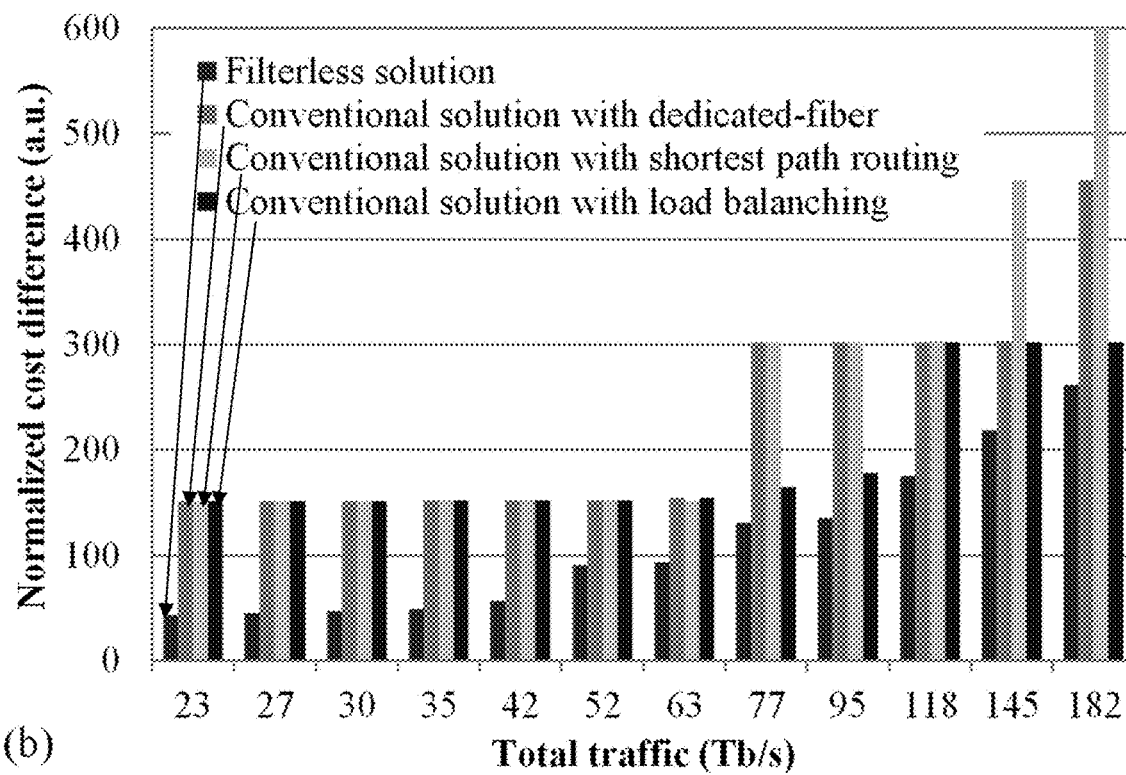
Figure 5:
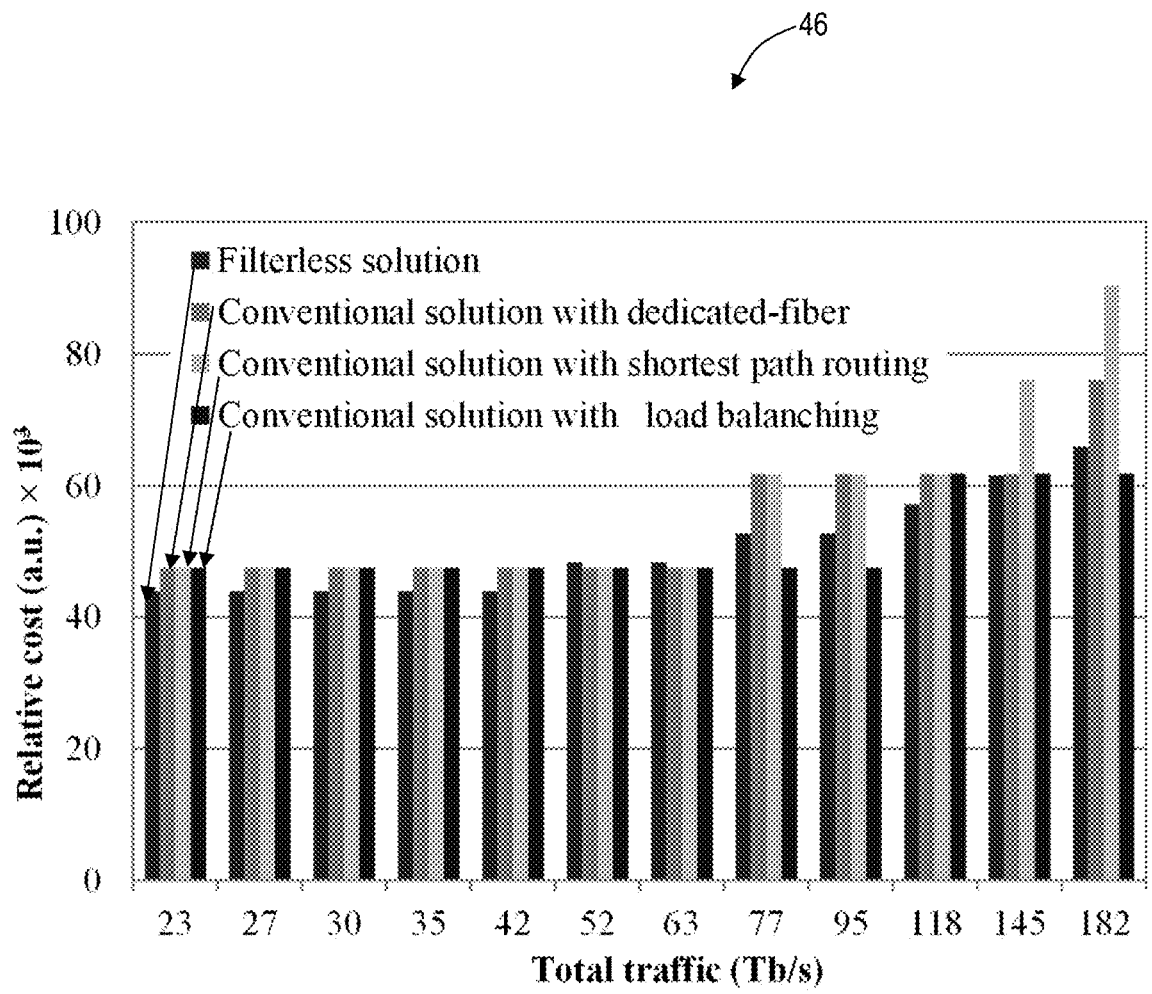

Referring to FIGS. 4A, 4B, and 5, in an exemplary embodiment, graphs 42, 44, 46 illustrates costs of the filterless network architecture 10 relative to conventional solutions with dedicate-fiber, shortest path routing, and load balancing. For the network 5, in a conventional submarine network architecture, the edge terminals are equipped with WSS-based ROADMs which perform per wavelength routing in the optical domain. In order to achieve full switching capability, a WSS is connected to every outgoing fiber. A total of $\delta$WSSs is thus needed at a node with a nodal degree $\delta$. For both the filterless and conventional solutions, the total network cost was evaluated by calculating the extra components in the dry and wet plants. The unit costs of the terminal equipment are normalized to the cost of a 100 Gb/s DP-QPSK modem, whereas the unit costs of the line equipment are normalized to the cost per km of 3-fiber-pair deep sea cable. The cost of the cable depends on the number of fiber pairs, as well as on the type of cable (deep sea, continental shelf and armored, respectively) in order to reflect realistic deployment conditions. The cost of the repeaters also depends on the number of fiber pairs.

The cost of the dry plant of the filterless and conventional solutions for various traffic periods were also estimated and presented in FIGS. 4A and 4B. FIG. 4A shows the cost comparison between the fixed conventional and filterless solutions. The costs of the gridless conventional solutions with respect to the cost of the filterless solution are shown in FIG. 4B. It is obvious that filterless networks gives the flexibility of wavelength reconfiguration in the dynamic traffic environment. Therefore, the cost of a hypothetical gridless conventional network was also calculated and compared. From FIG. 4B, it is evident that there are large terminal cost savings in the filterless solution compared to the conventional gridless submarine solution. However, in the gridless conventional network, reconfigurable and gridless BUs are necessary for enabling the full flexibility. This cost was not included in the cost graphs as the reconfigurable BUs are not commercially available yet. The inclusion of that cost would result in the cost of the elastic conventional system even higher. FIG. 5 shows the relative costs of the wet plant for filterless and conventional solutions.

Transceiver and Wavelength Savings

Figure 6A:
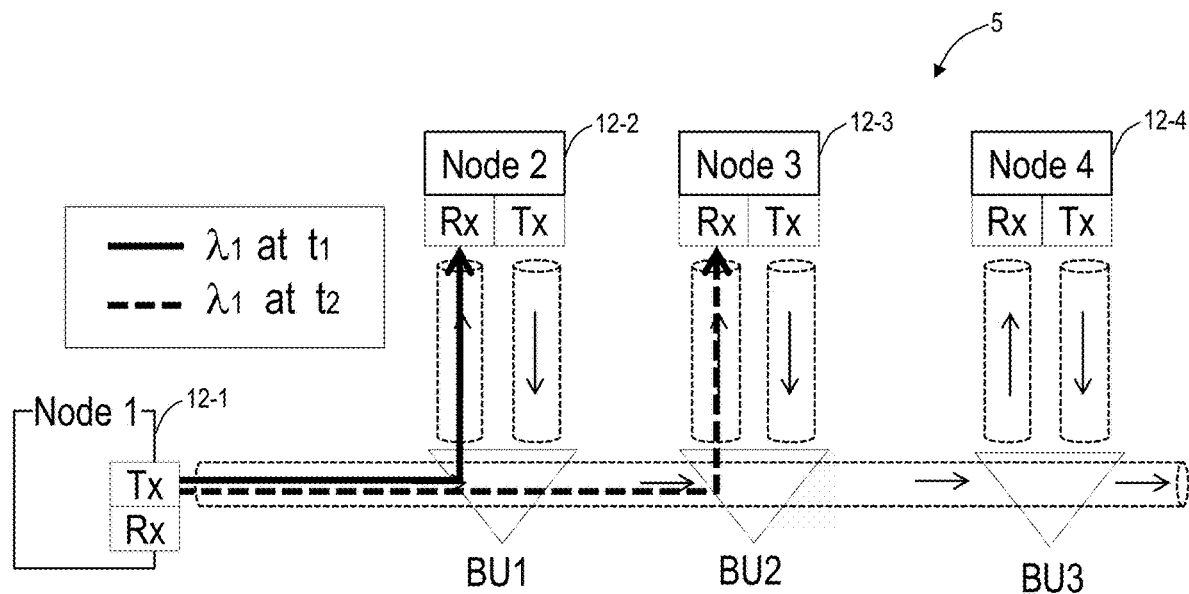
FIGS. 6A and 6B are network diagrams of a portion of the optical network of FIG. 1 illustrating resource savings based on the network resource optimization with the filterless network architecture.
Figure 6B:
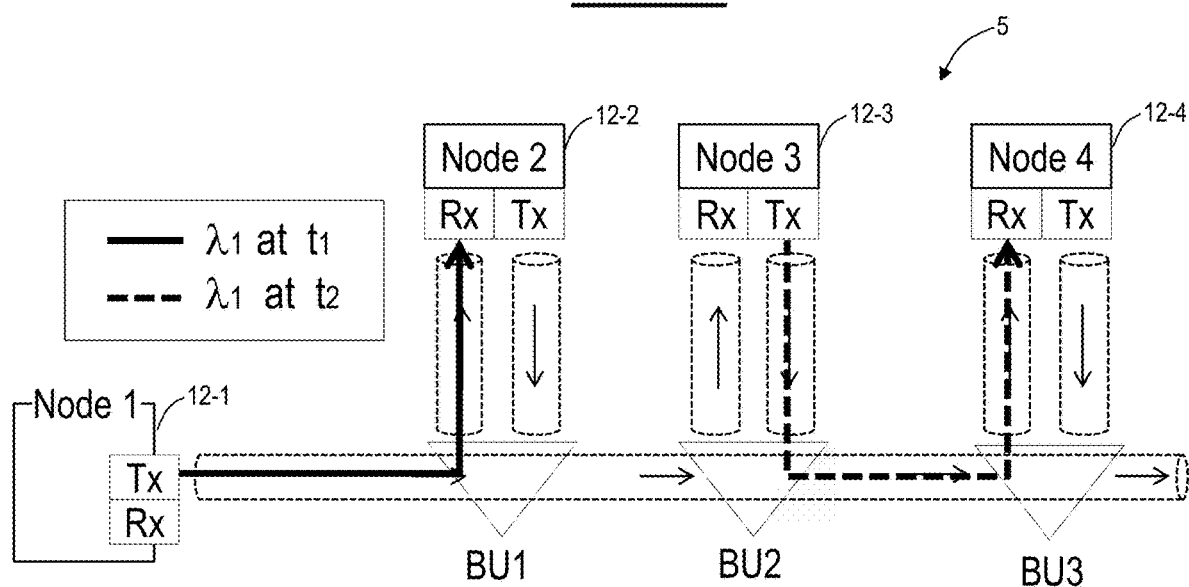

Referring to FIGS. 6A and 6B, in an exemplary embodiment, network diagrams illustrate a portion of the optical network 5 illustrating resource savings based on the network resource optimization with the filterless network architecture 10. FIG. 6A illustrates transceiver and wavelengths saving, and FIG. 6B illustrates only wavelength-saving (only one direction is shown for simplicity). FIG. 6A illustrates how savings are achieved in the network 5 with the network resource optimization.

A single transceiver connects the node 12-1 with the nodes 12-2, 12-3, respectively, at two different times $t_1$ and $t_2$ using $\lambda_1$, which saves one transceiver at the node 12-1 compared to a conventional fixed submarine network. This is based on the fact that the nodes 12-2, 12-3 experience the peak load at two different periods $t_1$ and $t_2$, respectively. This also saves one wavelength with respect to a filterless solution which does not take the time variation effect into account. Note that, for simplicity, only one direction of the signals is shown. If the same wavelength is used between the nodes 12-3, 12-4 at $t_2$ as shown in FIG. 6B, one wavelength can be saved. To evaluate and illustrate network savings, the optical network 5 is used to show savings in the number of transceivers and the number of wavelengths, based on the time difference of several hours between the end nodes.

Offline Capacity Planning Process

Figure 7:
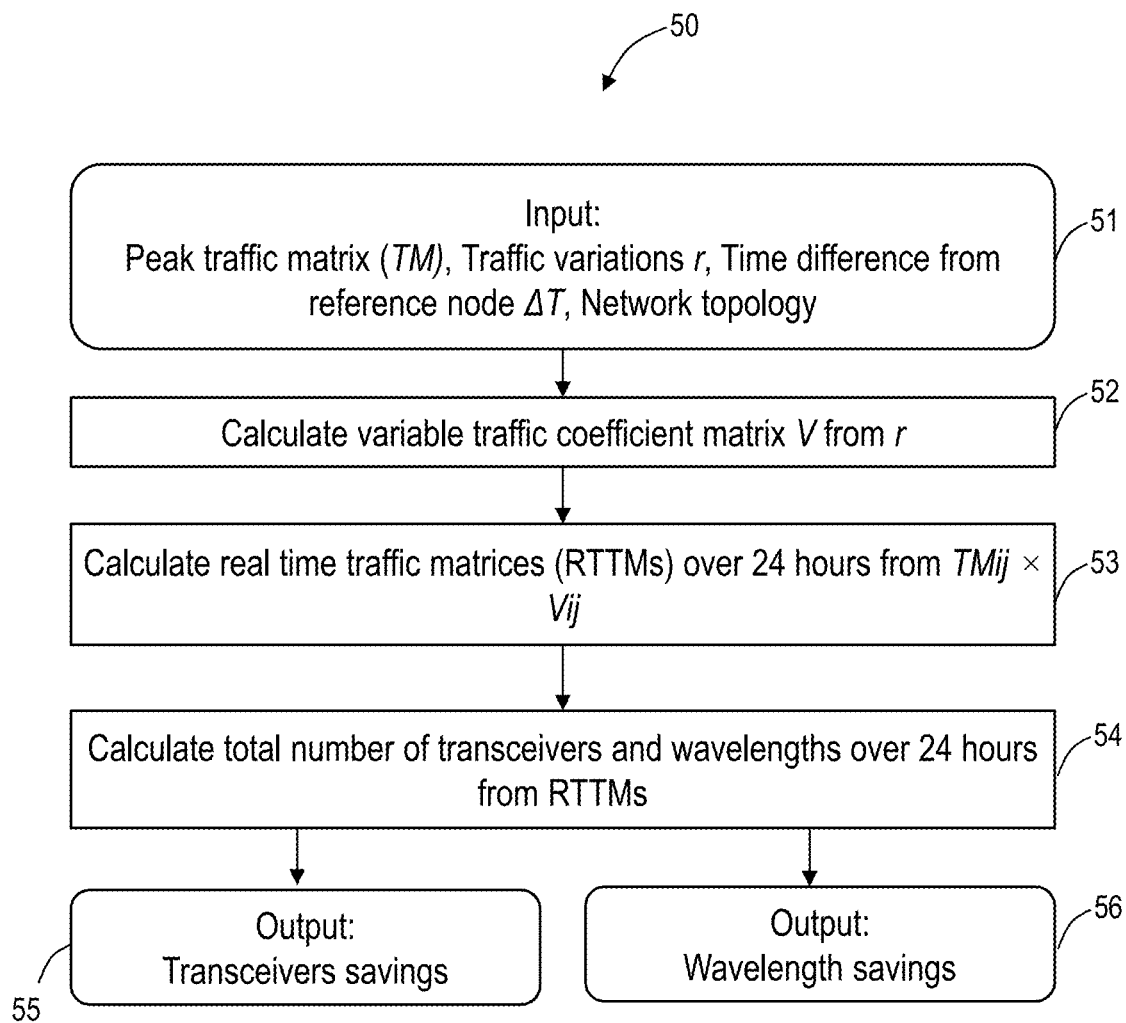
FIG. 7 is a flowchart of an example offline capacity planning process for calculating the number of transceivers and wavelength-saving under a variable traffic and time zone scenario.

Referring to FIG. 7, in an exemplary embodiment, a flowchart illustrates an offline capacity planning process 50 for calculating the number of transceivers and wavelength-saving under a variable traffic and time zone scenario. The offline capacity planning process 50 includes inputs of a peak traffic matrix (TM), traffic variations r, a time difference from the reference node $\Delta T$, and the network topology (step 51). The offline capacity planning process 50 includes calculating a variable traffic coefficient matrix V from r (step 52), calculating real-time traffic matrices (TLMs) over 24 hours from $TM_{ij} \times V_{ij}$ (step 53), and calculating a total number of transceiver and wavelengths over 24 hours from the TLMs (step 54). The output of the offline capacity planning process 50 include transceiver savings (step 55) and wavelength savings (step 56).

In order to calculate the total number of transceivers in a filterless network, the offline capacity planning process 50 includes calculating the real time traffic matrix (TLM) from the traffic matrix (TM) used for the conventional solution and the traffic variation and time difference between nodes. Note, that the TM contains the values in Gb/s, which represents the traffic matrix for a conventional network. In order to calculate the total number of transceivers required in the filterless solution, groups of the traffic elements can be made that belong to same fiber tree and the same source node. The summations of each group over all the real time traffic matrices are compared, and the maximum values are used to calculate the total number of transceivers needed over 24 hours in the given network. To calculate the total number of wavelengths, the summation of the TLMs over 24 hours are compared, and the maximum value is taken as the wavelength consumption. The summations of each group are compared with each other, and the maximum values are used to form a traffic matrix with biggest groups (TMBG). Finally, the transceiver savings is calculated from the difference between TM and TMBG. To calculate the number of wavelengths, the summation of the TLMs over 24 hours are compared, and the maximum value is taken as the wavelength consumption in the filterless network which takes time-based traffic variation into account. Finally, the wavelength savings are obtained from the difference between the total number of wavelengths needed in the filterless solutions which does not take time-based traffic variation into account, and the one which takes time-based traffic variation into account.

Online/Real-Time Network Operation and Capacity Reassignment Process

Figure 8:
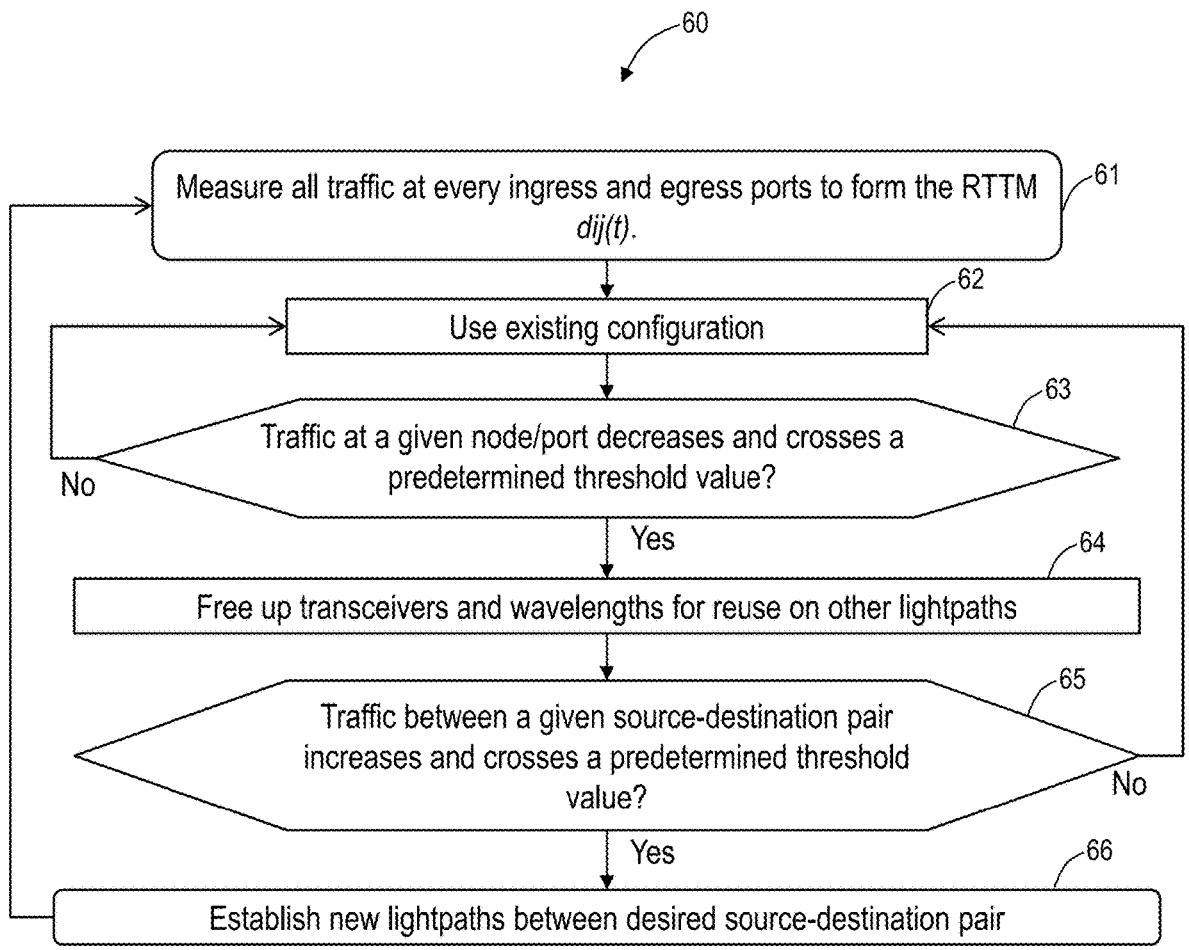
FIG. 8 is a flowchart of an example online/real-time network operation and capacity reassignment process for calculating the number of transceivers and wavelength-saving under a variable traffic and time zone scenario.

Referring to FIG. 8, in an exemplary embodiment, a flowchart illustrates an online/real-time network operation and capacity reassignment process 60 for calculating the number of transceivers and wavelength-saving under a variable traffic and time zone scenario. The capacity reassignment process 60 includes measuring all traffic at every ingress and egress ports to form the TLM $d_{ij}(t)$ (step 61), and the network operates using an existing configuration (step 62). The capacity reassignment process 60 includes checking if traffic at a given node/port decreases and crosses a predetermined threshold value (step 63), and if not, the network operates using the existing configuration (step 62), and if so, the capacity reassignment process 60 includes freeing up transceivers and/or wavelengths for reuse on other lightpaths (step 64). The capacity reassignment process 60 includes checking if traffic between a given source-destination pair increases and crosses a predetermined threshold value (step 65), and if not, the network operates using the existing configuration (step 62), and if so, the capacity reassignment process 60 includes establishing new lightpaths between the desired source-destination pair (step 66).

Traffic Loading Matrix (TLM)

Figure 9:
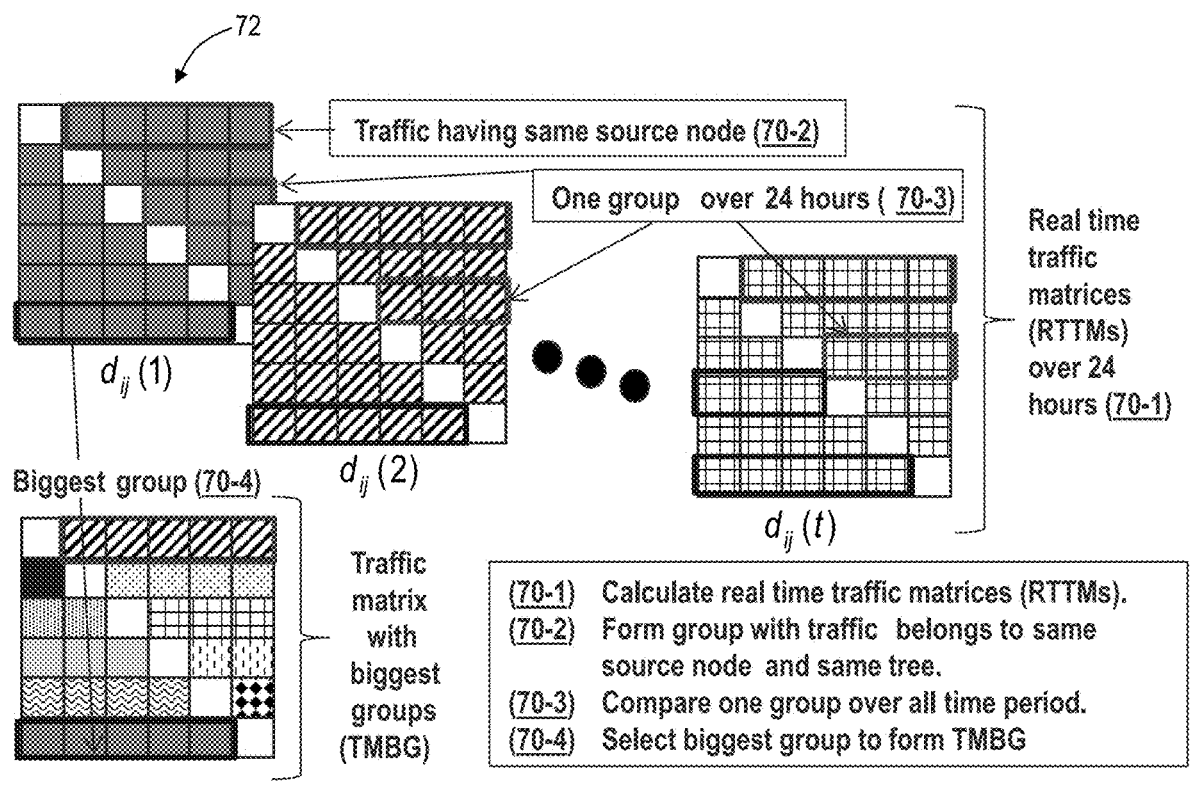
FIG. 9 is a block diagram of exemplary operations with Traffic Loading Matrices (TLMs)

Referring to FIG. 9, in an exemplary embodiment, a block diagram illustrates exemplary operations 70-1-70-4 with a TLM 72. FIG. 9 illustrates the operations 70 for calculating the number of transceivers saving in a network under time-based traffic variation. In order to calculate the total number of transceivers in a filterless network, the real time traffic matrices (TLMs) 72 were estimated by using the traffic matrix (TM) used for the conventional solution and the time-based traffic variation vector p and time difference between the nodes 12 (step 70-1). Note that the TM can contain the values in Gb/s, which represents a static traffic matrix for a conventional network. After obtaining all the TLMs, the groups of the traffic elements that belong to same fiber tree and same source node are made (step 70-2). The summations of each group are compared with each other (step 70-3), and the maximum values are used to form a traffic matrix with biggest groups (TMBG) (step 70-4). Finally, the transceiver saving is calculated from the difference between TM and TMBG. To calculate the number of wavelengths, the summation of the TLMs over 24 hours are compared, and the maximum value is taken as the wavelength consumption in the filterless network which takes time-based traffic variation into account. Finally, the wavelength savings are obtained from the difference between the total number of wavelengths needed in the filterless solutions which does not take time-based traffic variation into account, and the one which takes time-based traffic variation into account.

Figure 10:
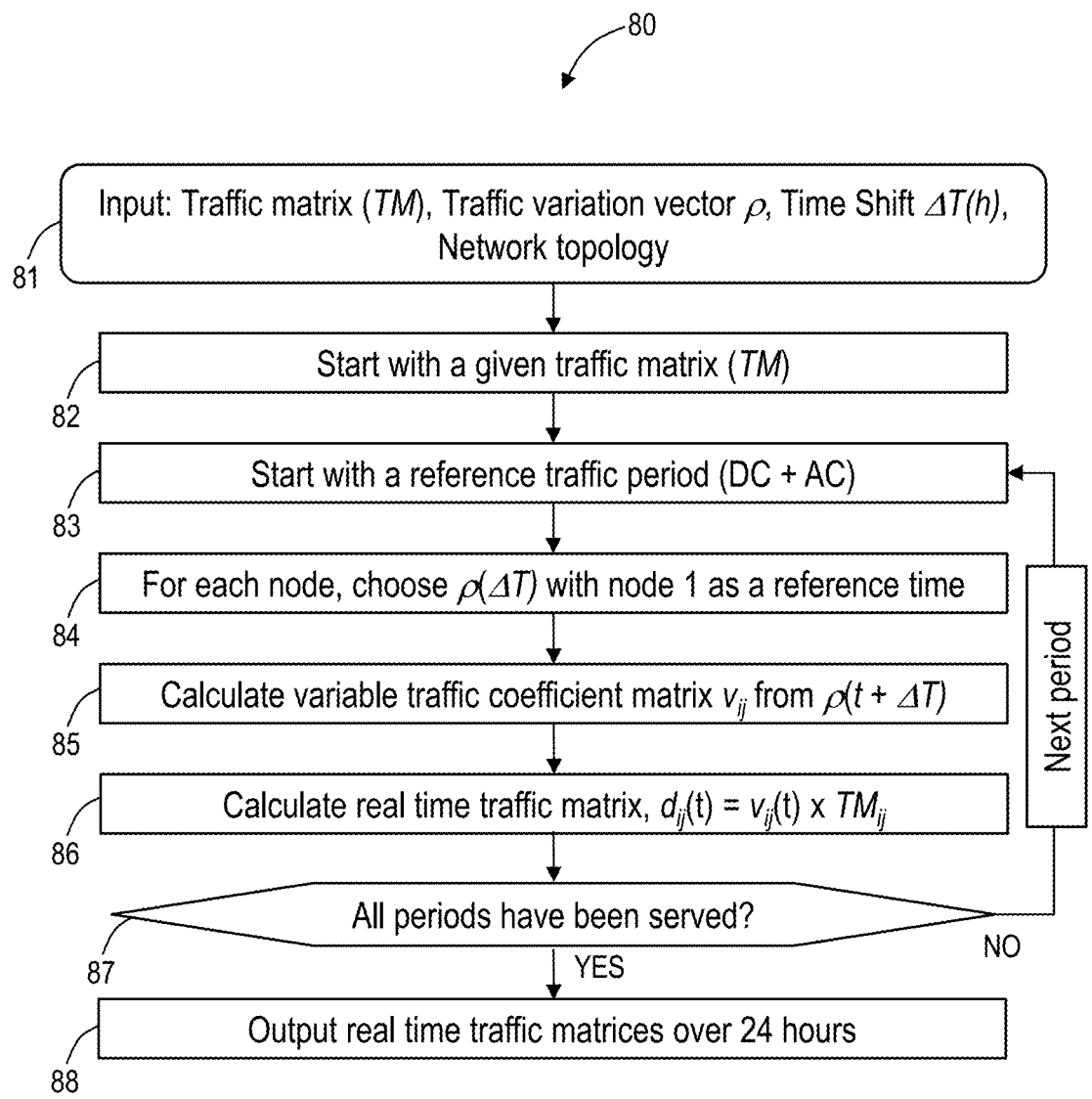
FIG. 10 is a flowchart of a process for generating the TLMs.

Referring to FIG. 10, in an exemplary embodiment, a flowchart illustrates a process 80 for generating the TLMs 72. When the traffic is varied, the required number of transceivers can also vary in a given node 12. The traffic variation pattern depends on the time phase in a day such as shown in FIG. 2. For generalizing the systems and methods, consider an N-node long-haul network connected by bidirectional optical fibers forming an arbitrary trunk-and-branch topology, where i ($1 \leq i \leq N$) and j ($1 \leq j \leq N$), respectively, denote originating and terminating nodes of a lightpath when used as a superscript or subscript.

The process 80 shows the calculation of the real-time traffic matrices (TLMs) from inputs such as the traffic matrix (TM), the daily traffic variation vector p, time shift $\Delta T(h)$, and network topology (step 81). The process starts with a given traffic matrix (TM) (step 82), and two traffic parameters can be introduced: one is constant traffic, and the other is variable traffic (step 83). If $\Delta T$ is the time difference (in hours) between node n and reference node 1, then $\rho(t+\Delta T)$ is the relative traffic activity at node n at a given time t in a day*step 84). The $\rho$ is a row vector and the outer product of $\rho$ with $\rho$ gives the effective traffic coefficient $v_{ij}(t)$, the equation of $v_{ij}(t)$ can be written in terms of $\rho$ as follows:

$$v_{ij}=\rho \otimes \rho = \rho^T \rho \quad (1)$$

Effective traffic coefficient $v_{ij}(t)$ represents effective traffic level between the nodes at a given time of the day. For example: when the time at node 1 is 6:00 am, time of node 15 is 6+9=15=3:00 pm, i.e., traffic at node 1 is lower than traffic at node 15. Therefore, the effective traffic between the two nodes will be obtained by multiplying the two coefficients $\rho(6+0) \times \rho(6+9)$ (step 85). Based on this example, equation (1) can be rewritten as follows:

$$v_{ij}(t)=\rho(t+\Delta T_i) \times \rho(t+\Delta T_j) \quad (2)$$

Total number of optical transceivers for conventional solution is equal to the total peak traffic demands between every node pair, which can be given by the following equation:

$$D=\Sigma d_{ij} \quad (3)$$

where $d_{ij}$ is the maximum value of the traffic between nodes i and j over 24 hours. Real time traffic matrix can be obtained by element-wise product of $v_{ij}(t)$ and $d_{ij}$ (step 86) which can be represented by the following equation:

$$d_{ij}(t)=v_{ij}(t) \times d_{ij} \quad (4)$$

where $d_{ij}(t)$ represents the traffic between i and j at time t.

The process 80 is repeated over all time periods (step 87) and output includes real time traffic matrices (TLMs) over 24 hours (step 88).

In an exemplary embodiment, assume a discrete traffic variation with (24*60)/k minutes interval between two traffic variations. The bigger the value of k, the smaller the time difference between two traffic variations. If the value of k is 24*60=1440 the traffic variation of every minute can be obtained for finding the maximum traffic demand between a fixed pair of nodes. In this model, the number of real time traffic matrix composed of elements $d_{ij}(t)$ depends on k. In an exemplary embodiment, assume k=96 traffic matrix estimated every 15 minutes over 24 hours. In a conventional solution, the total number of transceivers is the summation of maximum value of each element over 24 hours; maximum value of each element is calculated from the 96 elements.

In a conventional solution, a total of D transceivers is required to support D=Σd$_{ij}$ number of demands. In a filterless solution, fewer transceivers are needed compared to the conventional solution as lightpath reconfiguration is possible. In order to calculate the total number of transceivers required in a filterless solution, demand groups can be made in the traffic matrix. The demands are grouped that belong to the same fiber tree and the same source node, to compare the summation of each group over all the real time traffic matrices.

Figure 11:
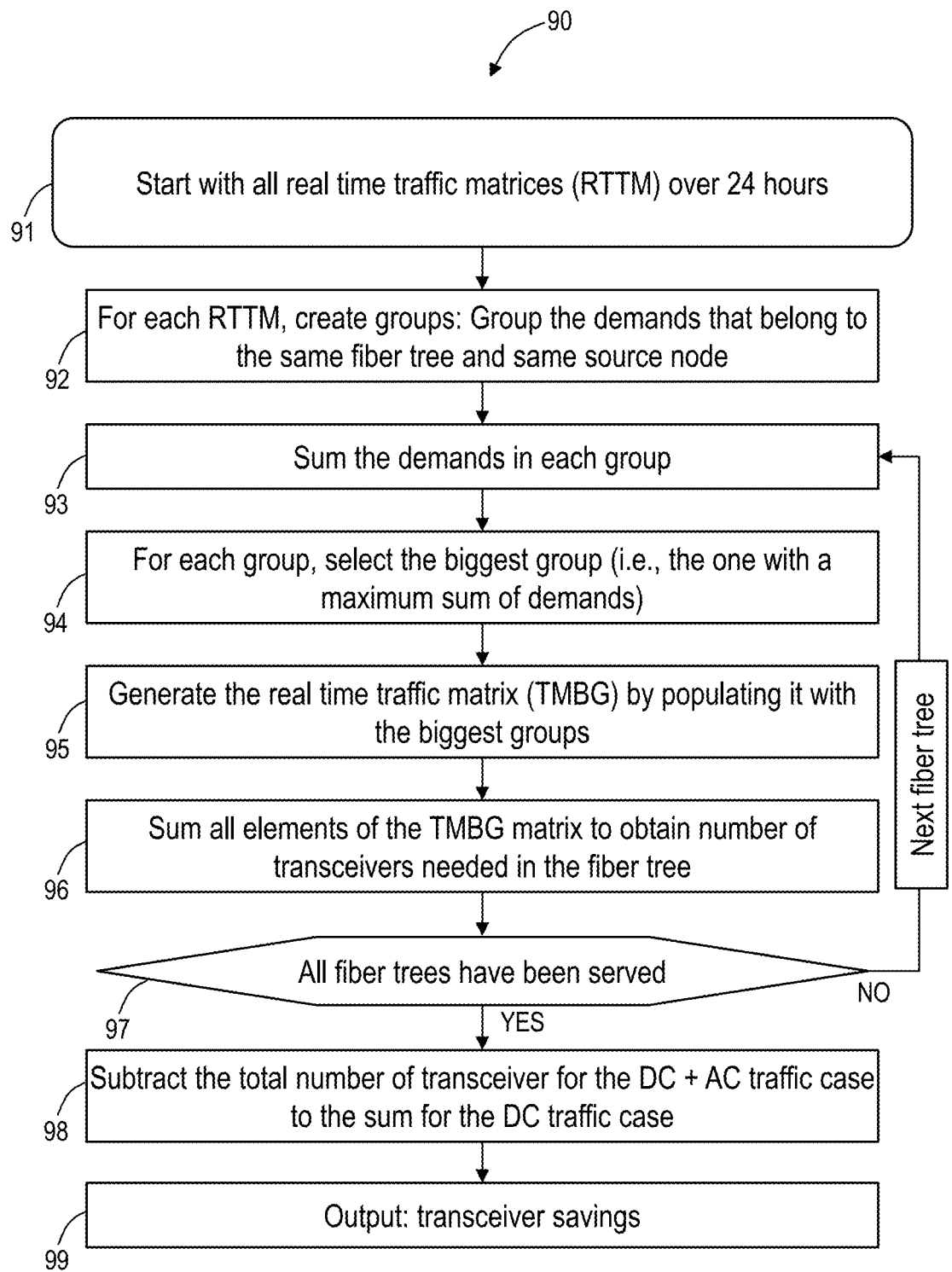
FIG. 11 is a flowchart of a process for calculating the number of transceivers under a variable «traffic and time zone» scenario.

Referring to FIG. 11, in an exemplary embodiment, a flowchart illustrates a process 90 for calculating the number of transceivers under a variable «traffic and time zone» scenario. The process 90 include starting with all TLMs over 24 hours (step 91). This can be based on the process 80. For each TLM, groups are created, i.e., demands are grouped that belong to the same fiber tree and same source node (step 92) and the demands are summed in each group (step 93). For each group, the biggest groups (i.e., the one with a maximum sum of demands) are selected (step 94). The traffic matrix with biggest groups (TMBG) is generated by populating it with the biggest groups (step 95). All elements of the TMBG are summed to obtained the number of transceivers needed in the fiber tree (step 96). The process 90 is performed for all fiber trees in the network (step 97). Once complete, the process 90 includes subtracting the total number of transceivers for the peak+trough traffic case to the sum for the trough traffic case (step 98) and the output is the transceiver savings (step 99).

The mathematical representation of the flowchart can be written as follows:

$$G_i^f = \text{Max}_t \left[ \sum_{j=i+1}^{N} d_{ij}(t) \right] \text{for } i < j \quad (5)$$

$$G_i^f = \text{Max}_t \left[ \sum_{j=1}^{i-1} d_{ij}(t) \right] \text{for } i > j \quad (6)$$

where f is the number of fiber trees. From the equations (5 and 6) total number of optical transceivers can be calculated as follows:

$$T_{TR} = \sum_{f=1}^{F} \sum_{i=1}^{N} G_i^f \quad (7)$$

where F represents the total number of fiber trees in the filterless network.

$$\% \, TR \text{ Saving} = 100 \times (D - T_{TR})/D \quad (8)$$

Figure 12:
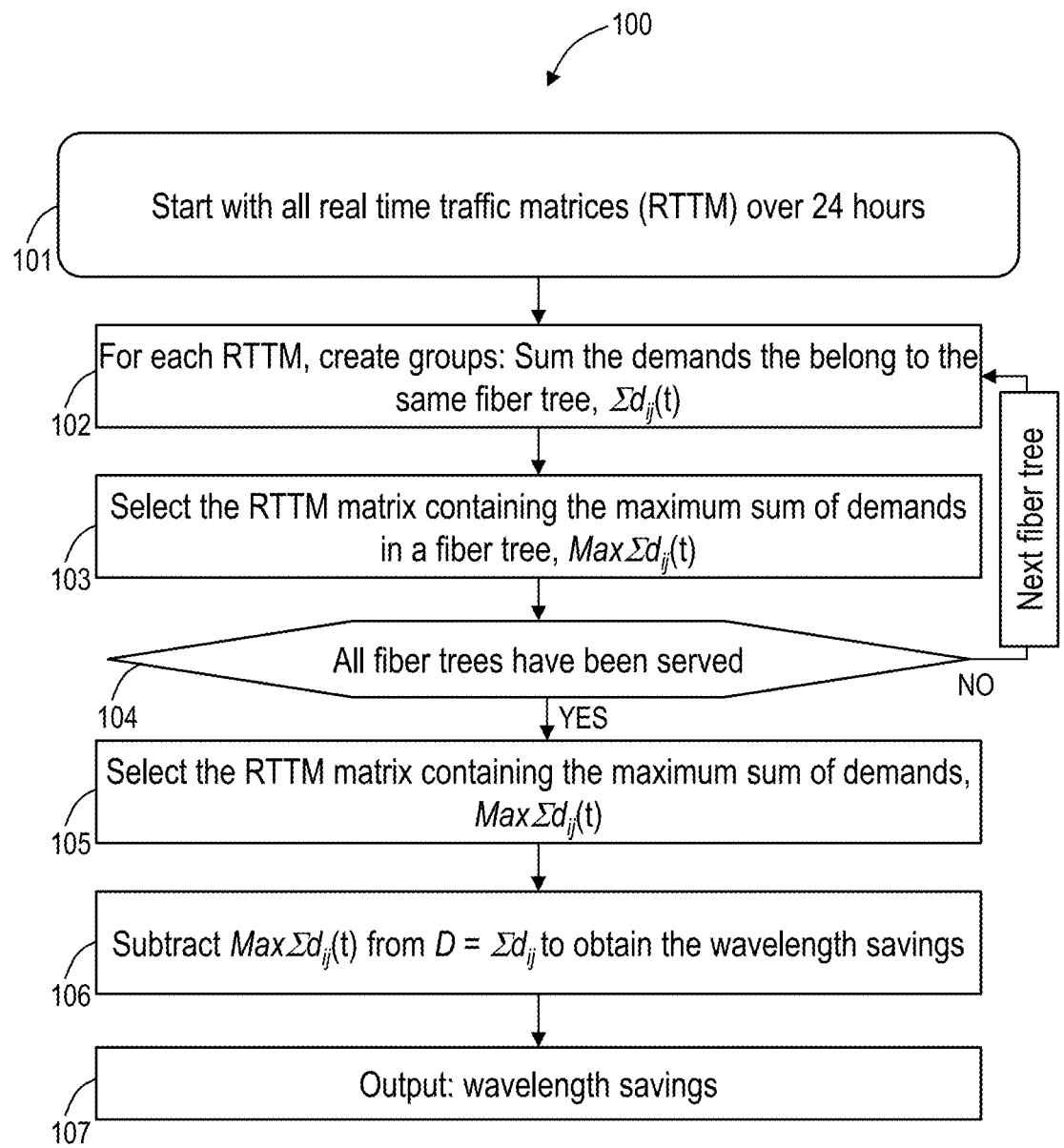
FIG. 12 is a flowchart of a process for calculating the number of wavelengths under a variable «traffic and time zone» scenario.

Referring to FIG. 12, in an exemplary embodiment, a flowchart illustrates a process 100 for calculating the number of wavelengths under a variable «traffic and time zone» scenario. The process 100 include starting with all TLMs over 24 hours (step 101). This can be based on the process 80 as well as reusing the TLMs from the process 90. The process 100 includes, for each TLM, creating groups by summing the demands the belong to the same fiber tree, Σd$_{ij}$(t) (step 102) and selecting the TLM containing the maximum sum of demands in a fiber tree, MaxΣd$_{ij}$(t) (step 103). These steps are repeated for all fiber trees (step 104). The process 100 includes selecting the TLM containing the maximum sum of demands, MaxΣd$_{ij}$(t) (step 105) and subtracting MaxΣd$_{ij}$(t) from D=Σd$_{ij}$ to obtain the wavelength savings (step 106) to output the wavelength savings (step 107).

In order to calculate the total number of wavelengths by taking the traffic variation into account, we use the TLM. The maximum number of wavelengths required over 24 hours can be calculated by taking the maximum values from the sum of all elements in each real-time traffic matrix as follows:

$$\lambda^f = \text{Max}_t \left[ \sum_i \sum_j d_{ij}(t) \right] / 2 \; i \neq j \quad (9)$$

where $\lambda^f$ represents the maximum number of wavelengths required over 24 hours in any fiber-tree out of F fiber trees. The wavelength-saving can be calculated as follows:

$$\% \, \lambda \text{ Saving} = 100 \times (D^f - \lambda^f)/D^f \quad (10)$$

where $D^f$ is the number of demands served on the fiber tree which serves highest demands out of F fiber trees.

Exemplary Operations

Figure 13:
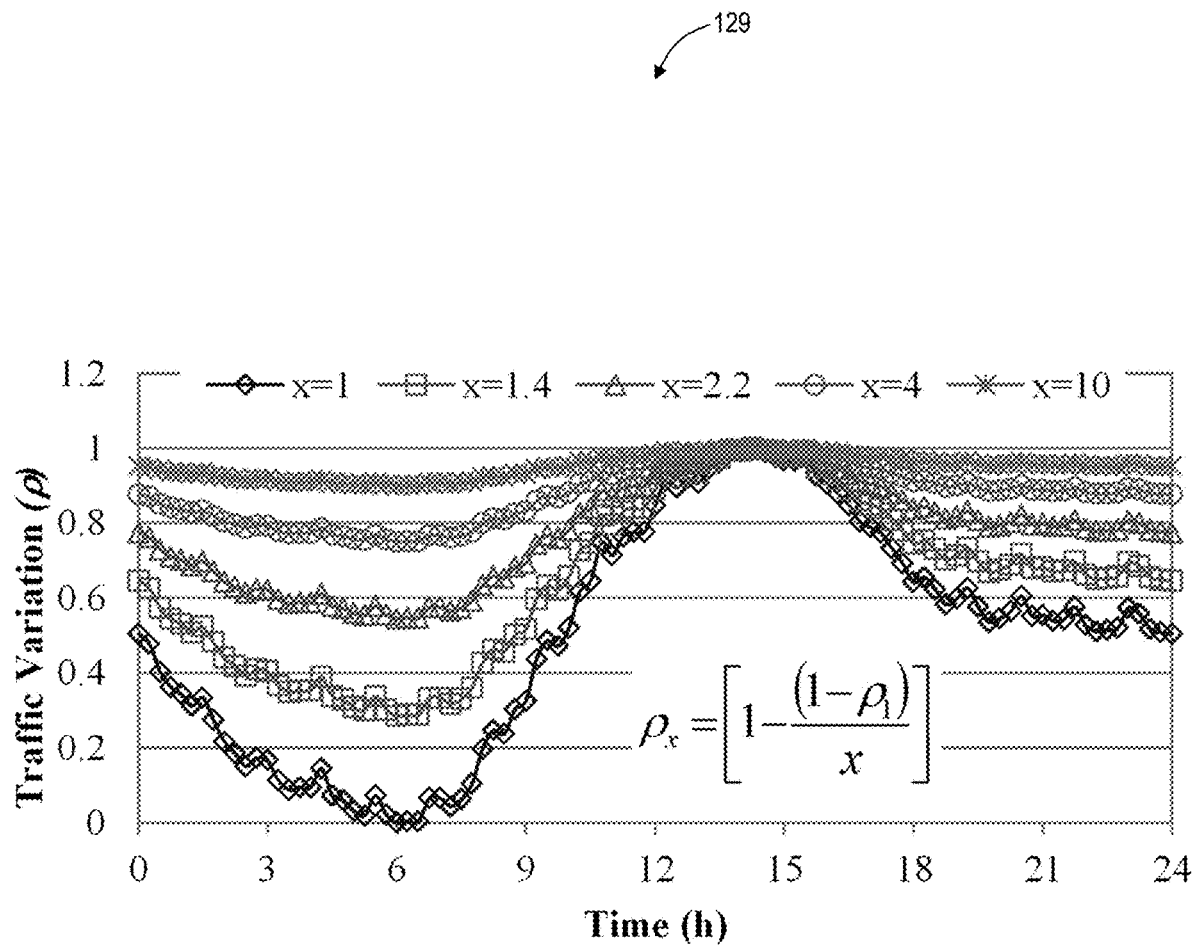
FIG. 13 is a graph of five different daily traffic variation scenarios, where the highest traffic variation was assumed from zero to 1.

Referring to FIG. 13, in an exemplary embodiment, a graph 120 shows five different daily traffic variation scenarios, where the highest traffic variation was assumed from zero to 1. However, in the real world, a more realistic 30% to 100% variation can be expected. For applying the systems and methods described herein to a wide range of network types and daily traffic variations, we formulate the variation pattern, where the traffic variation pattern depends on the value of x, and the value of traffic variation can be written as follows:

$$\rho_x = (1 - (1 - \rho_1)/x \quad (11)$$

where $\rho_i$ represents the variation from 0% to 100%.

The graph 120 shows traffic variation patterns with different amplitudes. For x=1, traffic varies from 0% to 100%, for x=1.4, traffic varies from 30% to 100%, and so on. In this disclosure for the systems and methods, results are presented for a set of different traffic variations to see what kind of savings can be expected in a network with these traffic variation patterns. It should be understood that although an illustrative implementation of one type of traffic variation pattern is provided herein, the disclosed systems and methods may be applicable to any kind of traffic variations including sinusoidal or any other waveforms. Therefore, the disclosure is not limited to the results for the traffic variation presented in the graph 120.

Figure 14A:
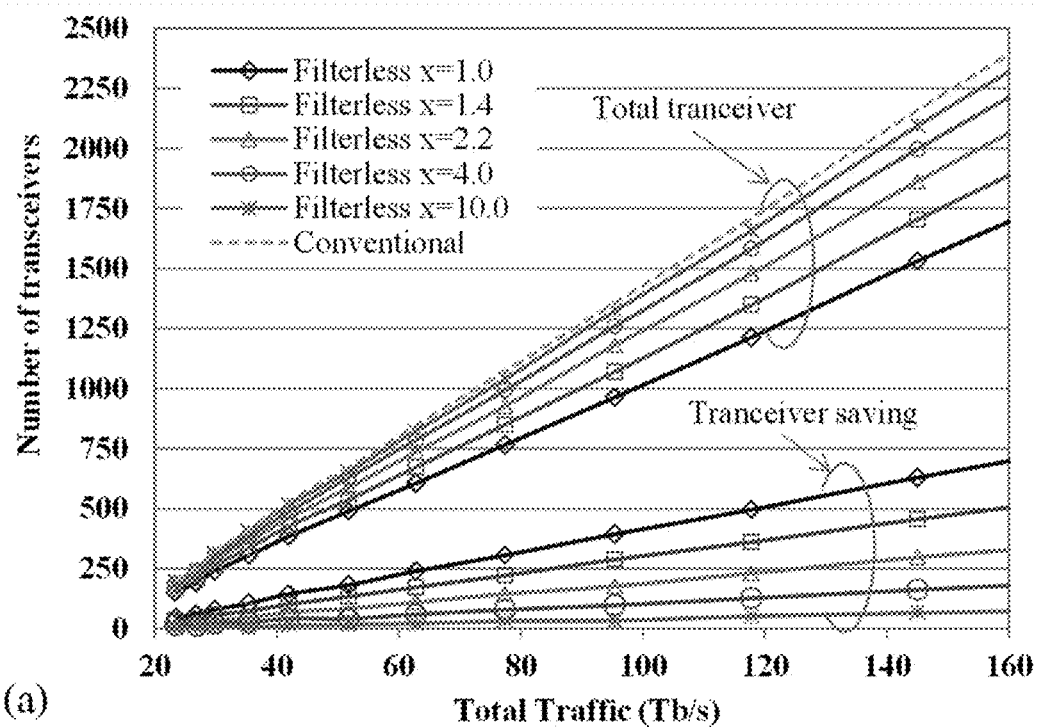
FIGS. 14A, 14B, 15A, and 15B are graphs of the transceiver savings (both in number and percentage) for the different daily traffic variations shown in the graph of FIG. 13.
Figure 14B:
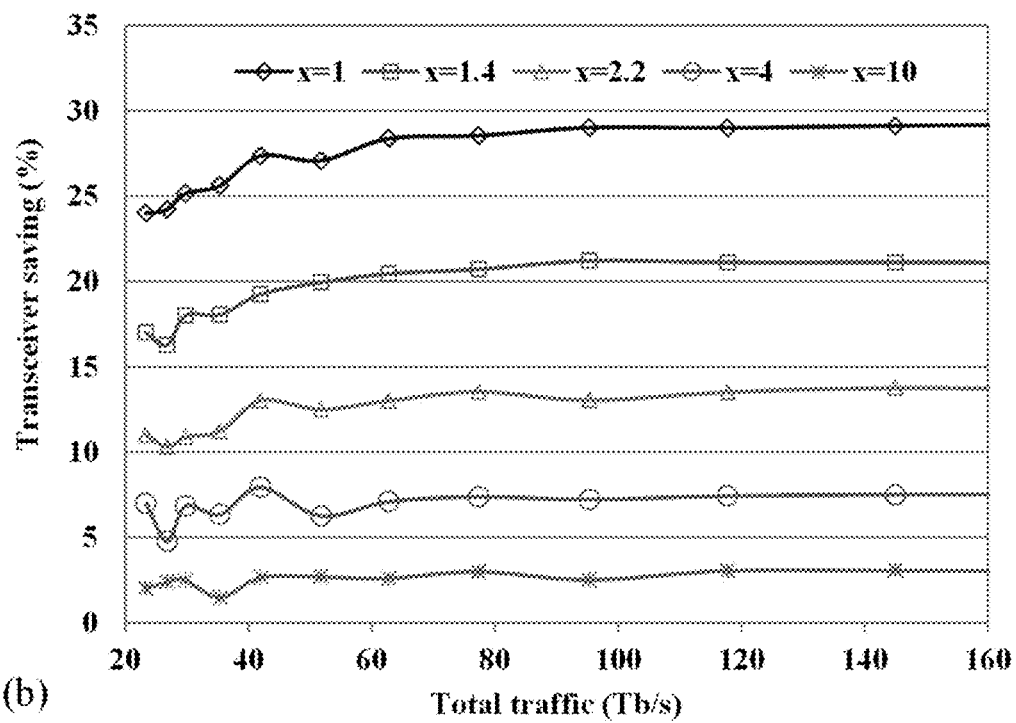

Referring to FIGS. 14A, 14B, 15A, and 15B, in exemplary embodiments, graphs illustrate the transceiver savings (both in number and percentage) for the different daily traffic variations shown in the graph 120. FIGS. 14A and 14B include a filterless solution with regeneration and FIGS. 15A and 15B include a filterless solution without regeneration.

Based on the analysis, the most common traffic variation with real Internet type traffic is represented by x=1.4 and x=2.2. These graphs show that a significant number of transceivers can be saved through reconfiguration of a filterless network as a function of daily traffic variations. FIGS. 14A and 14B show the results for the traffic scenario when all the demands are regenerated at the nodes 12-5, 12-9, 12-11 in the network 5. FIG. 14A compares the maximum number of total transceivers needed for two solutions for different traffic variations. It also shows the total number of transceiver saving obtained from the difference between a total number of transceivers needed in conventional and filterless solutions. From FIG. 14B, it can be seen that 13% to 21% of the transceivers can be saved when x varies between 1.4 and 2.2.

Figure 15A:
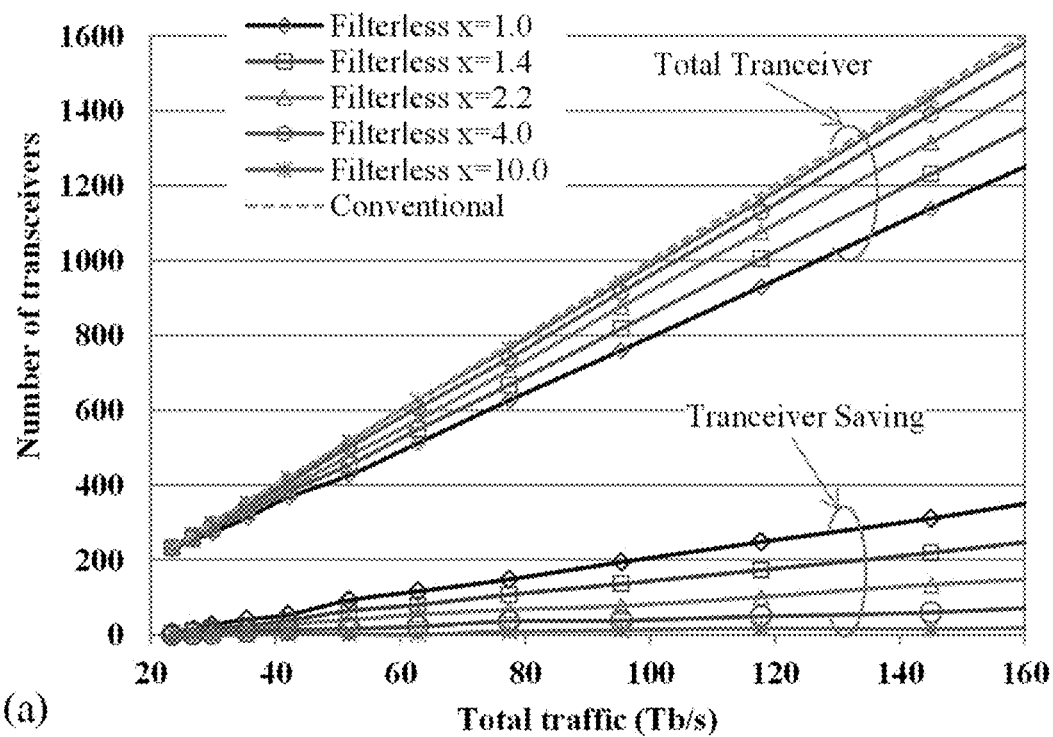
Figure 15B:
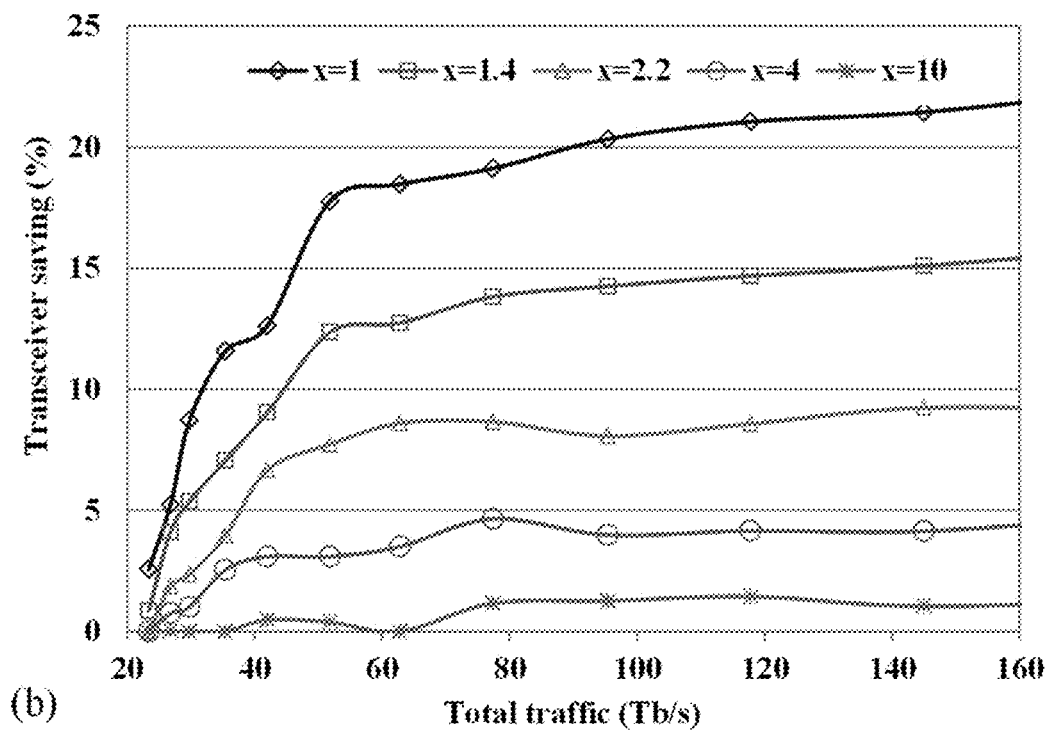

FIGS. 15A and 15B show the results for the traffic scenario when all the demands pass the nodes 12-5, 12-9, 12-11 of the network 5 without regeneration. Although this is not a realistic case, the simulation was done for showing the lower limit in terms of savings. This result also clarifies how many transceivers can be saved if each demand is routed in per demand basis. From FIG. 11, it is obvious that 7 to 15% transceivers can be saved when x varies between 1.4 and 2.2. It is apparent that the savings with regeneration are higher than the savings without regeneration. This is because, for every transceiver saved, two more transceivers can be saved at the intermediate nodes in the regeneration case. If the regeneration is performed on a per demand basis, then the level of savings will fall between the cases shown in FIGS. 14A, 14B, 15A, and 15B.

Figure 16A:
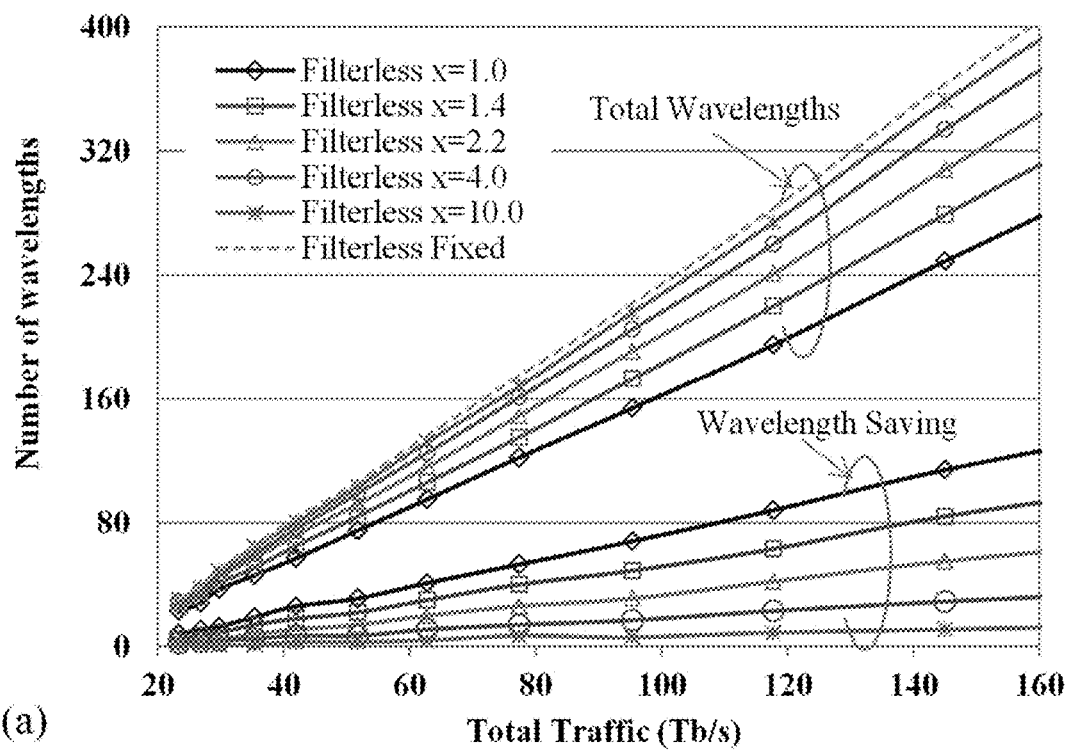
FIGS. 16A, 16B, 17A, and 17B are graphs of the wavelength savings (both in number and percentage) of the filterless solution for the different daily traffic variations shown in the graph of FIG. 13 when the time difference between the nodes is taken into account.
Figure 16B:
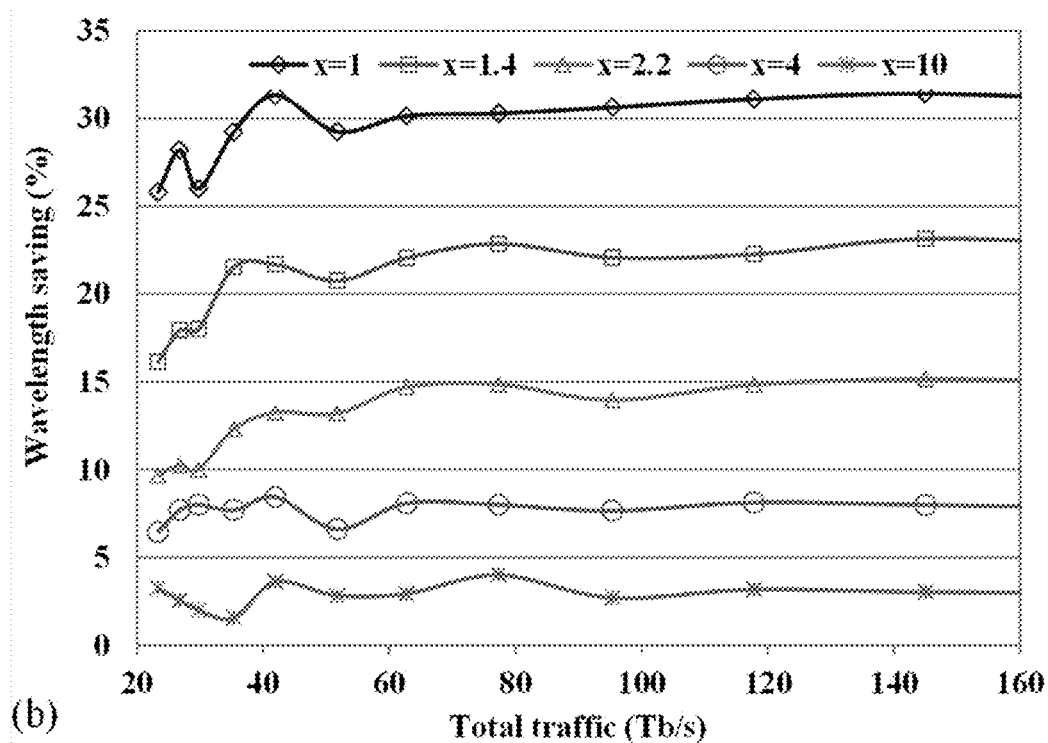

Referring to FIGS. 16A, 16B, 17A, and 17B, in exemplary embodiments, graphs illustrate the wavelength savings (both in number and percentage) of the filterless solution for the different daily traffic variations shown in the graph 120 when the time difference between the nodes is taken into account. It is apparent that the wavelength savings increase for higher traffic variation. FIGS. 16A and 16B show the results for the traffic scenario when all the demands are regenerated at the nodes 12-5, 12-9, 12-11. FIG. 16A shows the total wavelength savings, which were obtained from the difference between the total number of wavelengths needed in a filterless solution without the traffic variation effect taken into account, and a filterless solution that includes the time-based traffic variation. From FIG. 16B, it can be seen that 15% to 22% of the wavelengths can be saved when x varies between 1.4 and 2.2.

Figure 17A:
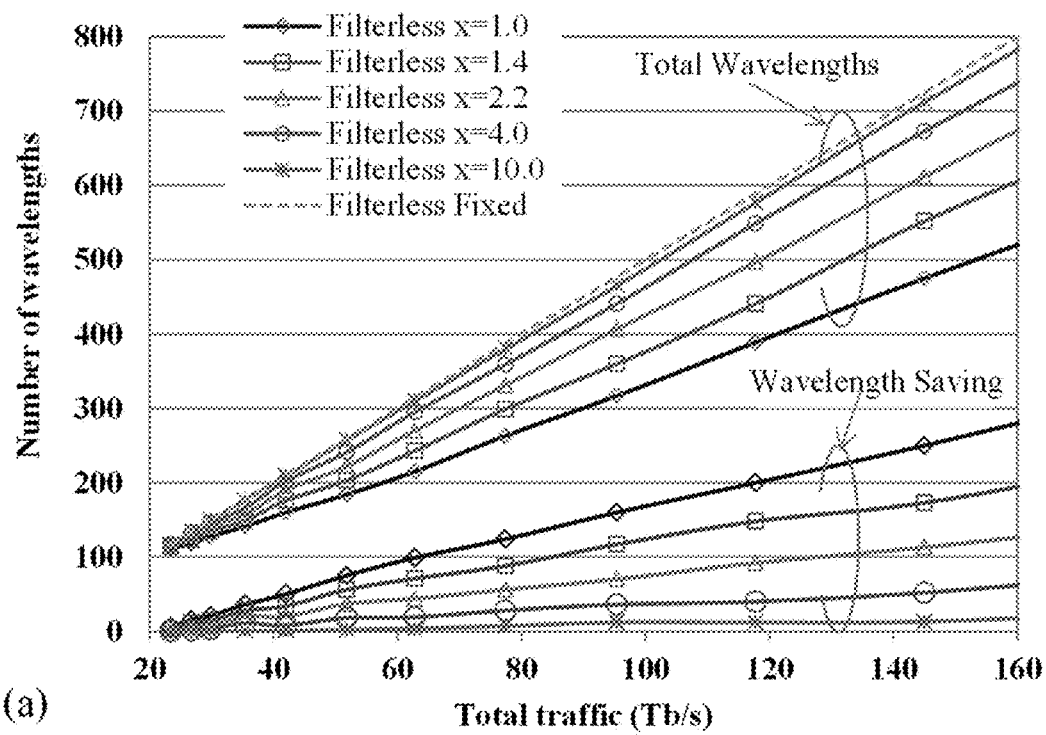
Figure 17B:
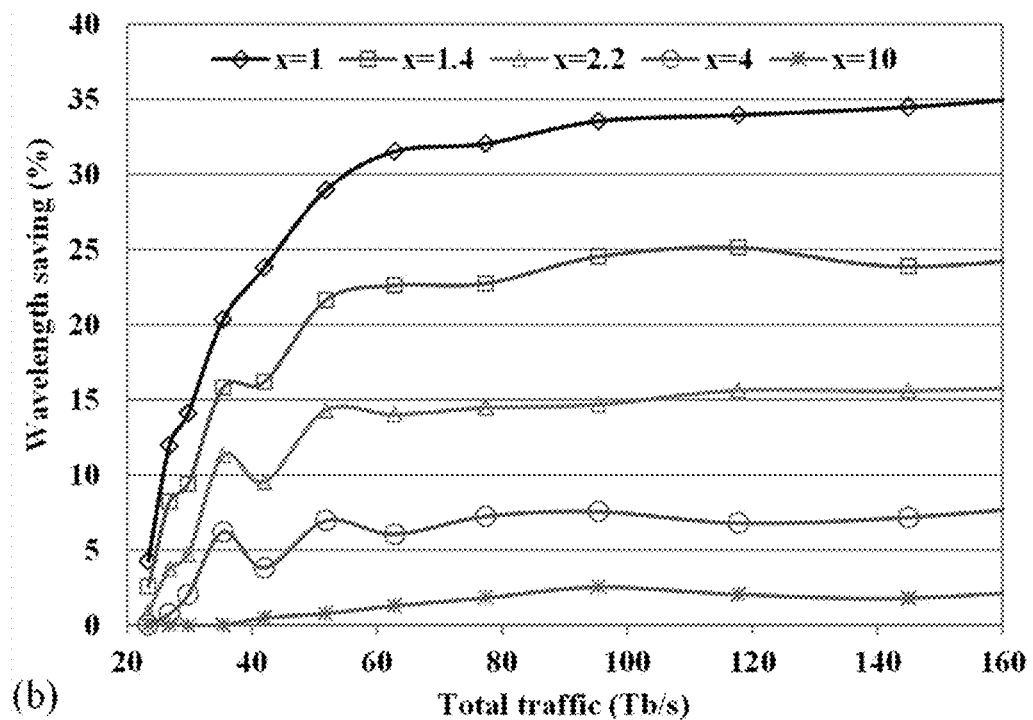

In FIG. 17A, the numbers of wavelengths required are higher than that in FIG. 16A. This is because, when the traffic is not regenerated the wavelengths are already consumed, and in filterless networks the wavelength can no longer be used—a new wavelength is needed for every new demand. From FIG. 17B, it is apparent that the wavelength-saving is higher. This is because, in the scenario where regeneration is performed at the nodes 12-5, 12-9, 12-11, there are four fiber trees in each direction, and one wavelength can be saved only when it is commonly saved in all four fiber trees. On the other hand, in the without regeneration scenario, there is only one fiber tree in each direction, and we assumed one wavelength is saved when it is saved in that single fiber tree.

In this disclosure, a filterless solution for a 15-node trunk and branch ULH submarine network is described for illustration. The results show that the filterless architecture can bring significant cost savings for both the terminals and line equipment at lower traffic scenario, without loss of agility. The capacity limits of the filterless and conventional solutions are similar. Up to 20%, optical transceivers can be saved by using the flexibility feature of filterless submarine networks covering different time zones. This result is very satisfactory, which may lead the network operator to deploy undersea filterless networks.

Exemplary Server

Figure 18:
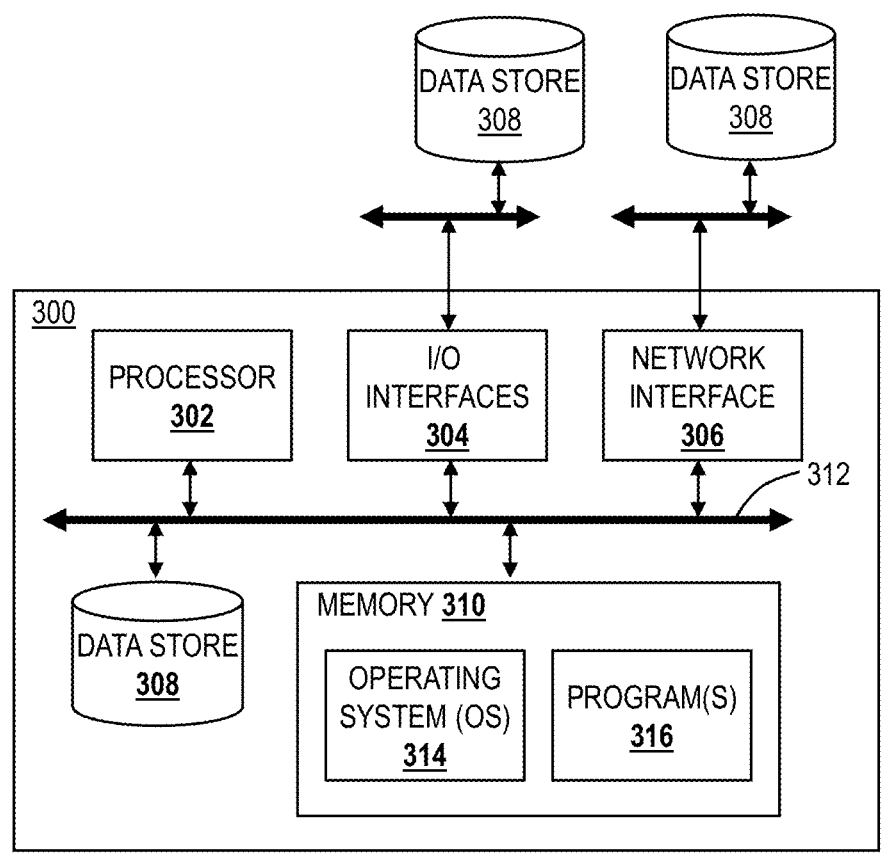
FIG. 18 is a block diagram of a server, for a processing device to implement a control plane, a Software Defined Networking (SDN) controller, a Path Computation Element (PCE), a planning tool, a network element-based control, or the like for implementing various techniques associated with the systems and methods described herein.

Referring to FIG. 18, in an exemplary embodiment, a block diagram illustrates a server 300, for a processing device to implement a control plane, a Software Defined Networking (SDN) controller, a Path Computation Element (PCE), a planning tool, a network element-based controller, or the like for implementing various techniques associated with the systems and methods described herein. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 18 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touchpad, and/or a mouse. System output can be provided via a display device and a printer (not shown). I/O interfaces 304 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally, in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, an apparatus adapted for network resource optimization based on time-varying traffic in an optical network with a filterless architecture includes circuitry adapted to determine traffic variations based on the time-varying traffic in the optical network; and circuitry adapted to cause adjustment of one or more of transceivers and wavelengths between nodes in the optical network based on the traffic variations and using the filterless architecture. The adjustment minimizes the number of the transceivers and the wavelengths based on the traffic variations and the time-varying traffic. The optical network can geographically span multiple time zones, contributing to the time-varying traffic. The optical network can be a submarine network with branching units including splitters and combiners for the filterless architecture. The adjustment can be performed one of a) offline for capacity planning in the optical network and b) online for capacity reassignment in the optical network.

The filterless architecture can include a broadcast-and-select node architecture, where one wavelength is broadcast to a plurality of nodes through splitters and combiners, and a coherent optical receiver which selectively receives a desired wavelength from a plurality of available wavelengths and rejects a plurality of undesired wavelengths without the need for a channel filter. The filterless architecture can include passive optical components. The adjustment can be performed over a 24-hour period based on the traffic variations.

In another exemplary embodiment, a system for network resource optimization based on time-varying traffic in an optical network with a filterless architecture includes a processor; and memory storing instructions that, when executed, cause the processor to determine traffic variations based on the time-varying traffic in the optical network, and cause adjustment of one or more of transceivers and wavelengths between nodes in the optical network based on the traffic variations and using the filterless architecture. The adjustment minimizes the number of the transceivers and the wavelengths based on the traffic variations and the time-varying traffic. The optical network can geographically span multiple time zones, contributing to the time-varying traffic. The optical network can be a submarine network with branching units including splitters and combiners for the filterless architecture.

Also, it will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical network comprising:
   a plurality nodes interconnected to one another via wavelengths that are transmitted and received via corresponding transceivers, wherein the optical network is an ultra-long-haul network spanning multiple time zones, and wherein each of the plurality of nodes includes a filterless architecture that enables transceivers to broadcast and to change connections between nodes by adjustment of receivers to selectively receive the broadcast; and a server configured to obtain a peak traffic matrix containing bandwidth values based on measured time-varying traffic over a period of time, calculate variable traffic coefficient matrix based on traffic variations, calculate real-time traffic matrices over the period of time based on the variable traffic coefficient matrix, the peak traffic matrix, and time differences of nodes, calculate a total number of wavelengths needed after the period of time based on the real time traffic matrices, wherein the total number is calculated using groupings of fiber trees and source nodes of the plurality of nodes to determine the total number based on the real time traffic matrices in the period of time, and cause adjustment of the one or more of the transceivers to provide the total number of wavelengths between the plurality of nodes based on the calculated total number using the filterless architecture.

2. The optical network of claim 1, wherein the calculated total number includes a minimum number of the wavelengths to support traffic based on the real time traffic matrices.

3. The optical network of claim 1, wherein the optical network is a submarine network with branching units comprising splitters and combiners for the filterless architecture.

4. The optical network of claim 1, wherein the server operates one of a) offline for capacity planning in the optical network and b) online for capacity reassignment in the optical network.

5. The optical network of claim 1, wherein the filterless architecture includes a broadcast-and-select node architecture, where one wavelength is broadcast to a plurality of nodes through splitters and combiners, and a coherent optical receiver which selectively receives a desired wavelength from a plurality of available wavelengths and rejects a plurality of undesired wavelengths without the need for a channel filter.

6. The optical network of claim 1, wherein the filterless architecture includes passive optical components.

7. The optical network of claim 1, wherein the adjustment is performed over a period based on the real time traffic matrices.

8. An optical node comprising:

one or more transceivers configured to transmit and receive wavelengths between a plurality of nodes in an ultra-long-haul network spanning multiple time zones;

a filterless architecture connected to the one or more transceivers, wherein the filterless architecture enables the one or more transceivers to broadcast and to change connections between nodes by adjustment of receivers to selectively receive the broadcast; and a server configured to obtain a peak traffic matrix containing bandwidth values based on measured time-varying traffic over a period of time, calculate variable traffic coefficient matrix based on traffic variations, calculate real-time traffic matrices over the period of time based on the variable traffic coefficient matrix, the peak traffic matrix, and time differences of nodes, calculate a total number of wavelengths needed at the optical node after the period of time based on the real time traffic matrices, wherein the total number is calculated using groupings of fiber trees and the optical node as a source node of the plurality of nodes to determine the total number based on the real time traffic matrices in the period of time, and cause adjustment of the one or more of the transceivers to provide the total number of wavelengths between optical node and the plurality of nodes based on the calculated total number using the filterless architecture.

9. The optical node of claim 8, wherein the calculated total number includes a minimum number of the wavelengths to support traffic based on the real time traffic matrices.

10. The optical node of claim 8, wherein the optical network is a submarine network with branching units comprising splitters and combiners for the filterless architecture.

11. The optical node of claim 8, wherein the server operates one of a) offline for capacity planning in the optical network and b) online for capacity reassignment in the optical network.

12. The optical node of claim 8, wherein the filterless architecture includes a broadcast-and-select node architecture, where one wavelength is broadcast to a plurality of nodes through splitters and combiners, and a coherent optical receiver which selectively receives a desired wavelength from a plurality of available wavelengths and rejects a plurality of undesired wavelengths without the need for a channel filter.

13. The optical node of claim 8, wherein the filterless architecture includes passive optical components.

14. The optical node of claim 8, wherein the adjustment is performed over a period based on the real time traffic matrices.

15. A method of operating an optical network, comprising:

in a plurality nodes interconnected to one another via wavelengths that are transmitted and received via corresponding transceivers, wherein the optical network is an ultra-long-haul network spanning multiple time zones, and wherein each of the plurality of nodes includes a filterless architecture that enables transceivers to broadcast and to change connections between nodes by adjustment of receivers to selectively receive the broadcast, determining a peak traffic matrix containing bandwidth values based on measured time-varying traffic over a period of time;

calculating variable traffic coefficient matrix based on traffic variations;

calculating real-time traffic matrices over the period of time based on the variable traffic coefficient matrix, the peak traffic matrix, and time differences of nodes;

calculating a total number of wavelengths needed after the period of time based on the real time traffic matrices, wherein the total number is calculated using groupings of fiber trees and source nodes of the plurality of nodes to determine the total number based on the real time traffic matrices in the period of time; and configuring the one or more of the transceivers to provide the total number of wavelengths between the plurality of nodes based on the calculated total number using the filterless architecture.

16. The method of claim 15, wherein the calculated total number includes a minimum number of the wavelengths to support traffic based on the real time traffic matrices.

17. The method of claim 15, wherein the optical network is a submarine network with branching units comprising splitters and combiners for the filterless architecture.

18. The method of claim 15, wherein the filterless architecture includes a broadcast-and-select node architecture, where one wavelength is broadcast to a plurality of nodes through splitters and combiners, and a coherent optical receiver which selectively receives a desired wavelength from a plurality of available wavelengths and rejects a plurality of undesired wavelengths without the need for a channel filter.

19. The method of claim 15, wherein the filterless architecture includes passive optical components.

20. The method of claim 15, wherein the adjustment is performed over a period based on the real time traffic matrices.

* * * * *